US010252757B2

(12) United States Patent
Marchildon et al.

(10) Patent No.: US 10,252,757 B2
(45) Date of Patent: Apr. 9, 2019

(54) TRACK SYSTEM FOR ATTACHMENT TO A VEHICLE

(71) Applicant: SOUCY INTERNATIONAL INC., Drummondville (CA)

(72) Inventors: Louis-Frederic Marchildon, Drummondville (CA); Patrick L'Herault, St-Majorique de Grantham (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 170 days.

(21) Appl. No.: 15/485,699

(22) Filed: Apr. 12, 2017

(65) Prior Publication Data

US 2017/0291652 A1    Oct. 12, 2017

Related U.S. Application Data

(60) Provisional application No. 62/321,420, filed on Apr. 12, 2016.

(51) Int. Cl.
| | |
|---|---|
| *B62D 5/00* | (2006.01) |
| *B62D 55/084* | (2006.01) |
| *B62D 55/065* | (2006.01) |
| *B62D 55/104* | (2006.01) |
| *B62D 55/12* | (2006.01) |
| *B62D 55/24* | (2006.01) |
| *B62D 55/04* | (2006.01) |

(Continued)

(52) U.S. Cl.
CPC ........... *B62D 55/084* (2013.01); *B62D 55/04* (2013.01); *B62D 55/065* (2013.01); *B62D 55/104* (2013.01); *B62D 55/108* (2013.01); *B62D 55/12* (2013.01); *B62D 55/244* (2013.01); *B62M 2027/021* (2013.01)

(58) Field of Classification Search
CPC .... B62D 55/04; B62D 55/084; B62D 55/104; B62D 55/108; B62M 2027/021
See application file for complete search history.

(56) References Cited

U.S. PATENT DOCUMENTS

| | | |
|---|---|---|
| 5,607,210 A | 3/1997 | Brazier |
| 6,874,586 B2 | 4/2005 | Boivin et al. |
| 7,360,618 B2 | 4/2008 | Hibbert et al. |

(Continued)

FOREIGN PATENT DOCUMENTS

| | | |
|---|---|---|
| CA | 2612356 C | 10/2014 |
| CA | 2677421 C | 1/2017 |

*Primary Examiner* — Kevin Hurley
(74) *Attorney, Agent, or Firm* — BCF LLP

(57) ABSTRACT

A track system for a vehicle having a rear swing arm that is movable between a compressed suspension position and an extended suspension position. The track system has a frame and a dynamic traction device. The frame is pivotably attachable to the swing arm. The dynamic traction device has at least two elongate portions, one of which is movable relative to the other between a retracted position and an extended position and biased toward the retracted position. In use, the elongate portions interconnect the vehicle and the frame. When the vehicle is lifted off terrain, during at least a part of a movement of the swing arm from the compressed suspension position toward the extended suspension position, the dynamic traction device applies a torque to the frame and thereby changes a longitudinal angular position of the frame counter-clockwise relative to a left side of the vehicle.

20 Claims, 13 Drawing Sheets

(51) Int. Cl.
  *B62D 55/108* (2006.01)
  *B62M 27/02* (2006.01)

(56) References Cited

U.S. PATENT DOCUMENTS

| | | |
|---|---|---|
| 7,673,711 B1 | 3/2010 | Berg |
| 7,870,914 B2 | 1/2011 | Todd et al. |
| 8,056,655 B2 | 11/2011 | Mallette et al. |
| 8,312,945 B2 | 11/2012 | Bessette et al. |
| 8,632,138 B2 | 1/2014 | Bessette |
| 8,955,925 B2 | 2/2015 | Bessette et al. |
| 9,352,776 B2 | 5/2016 | Hansen |
| 2006/0254841 A1 | 11/2006 | Strong |

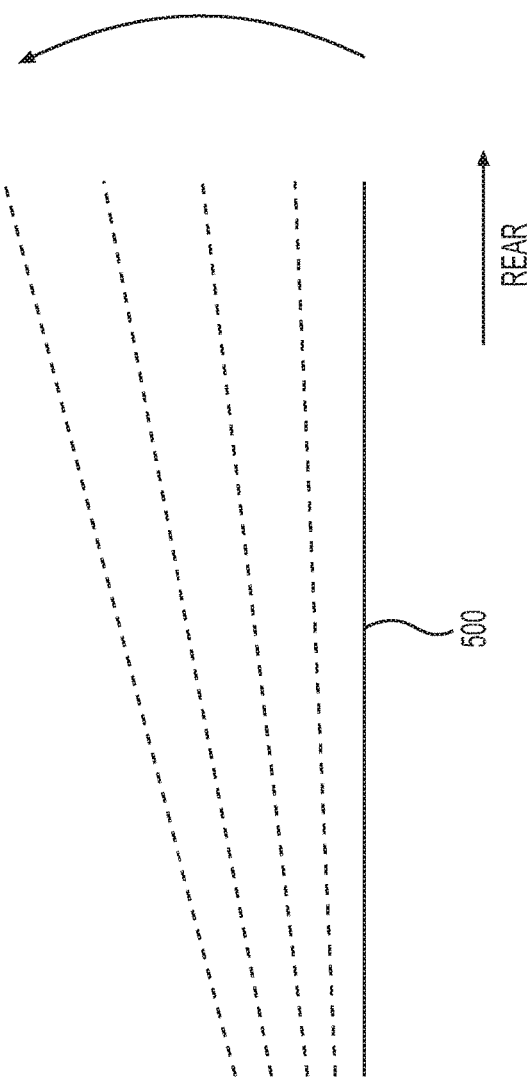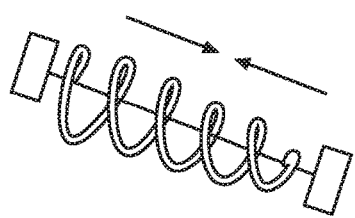
FIG. 5
(PRIOR ART)

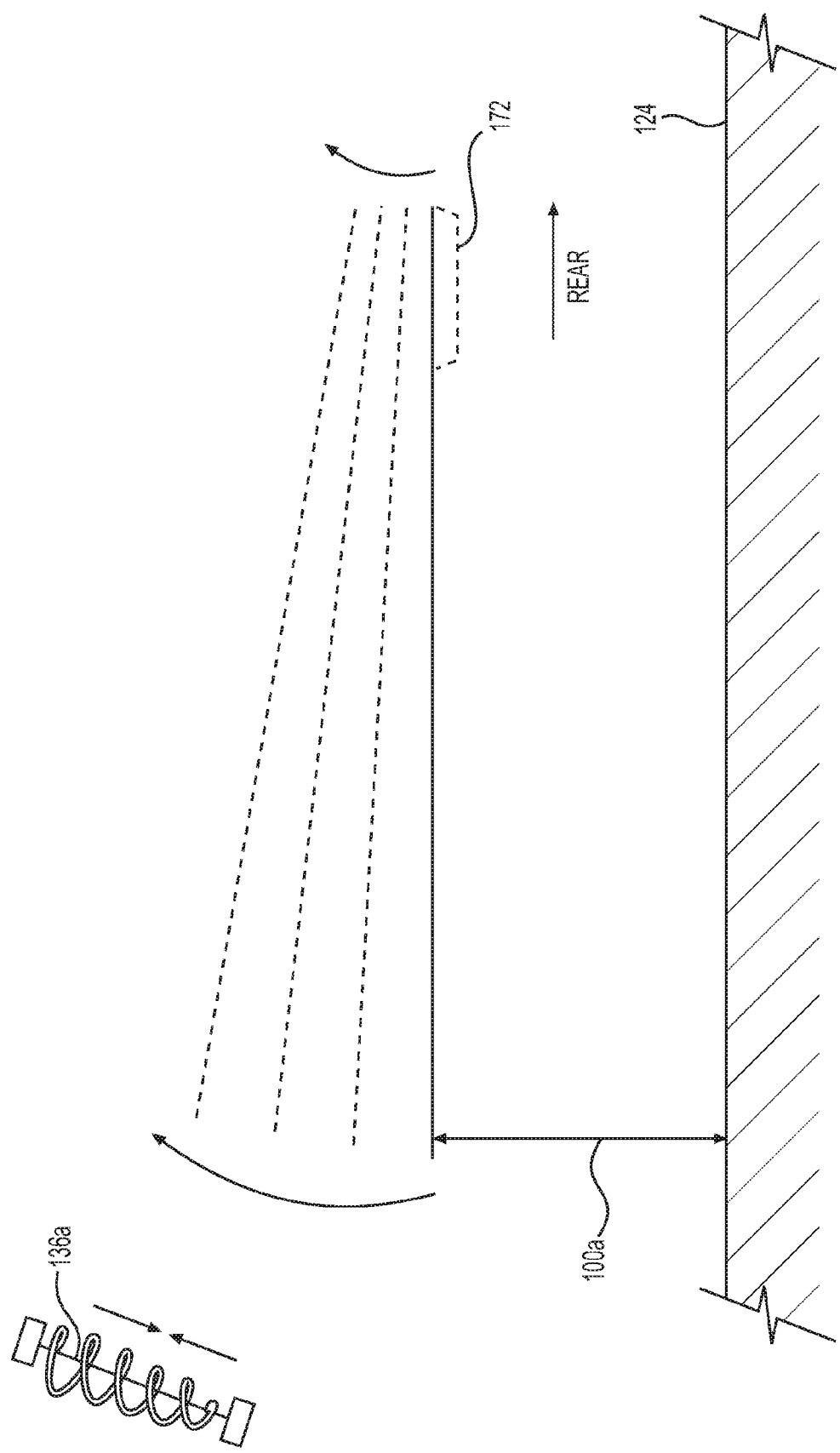

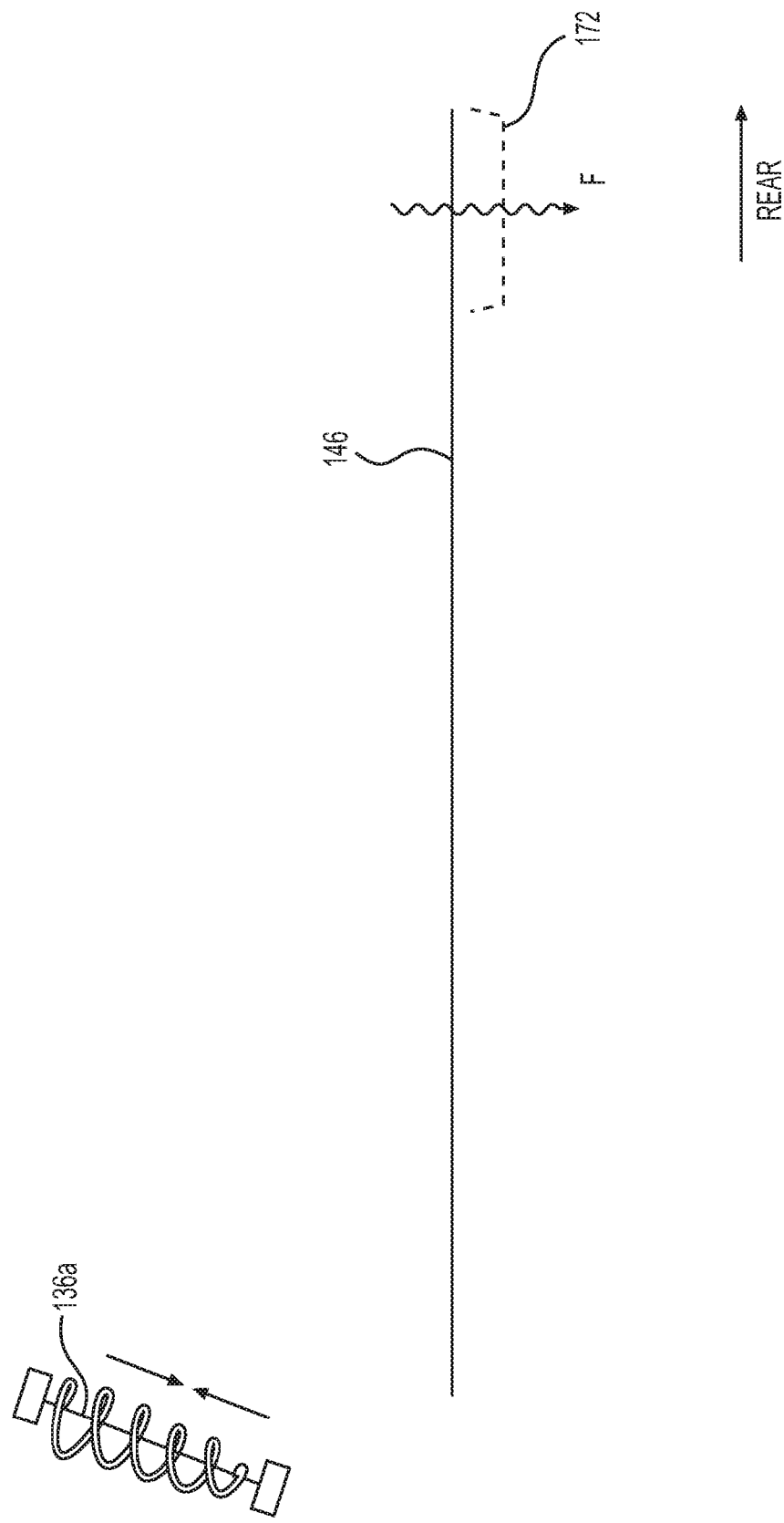

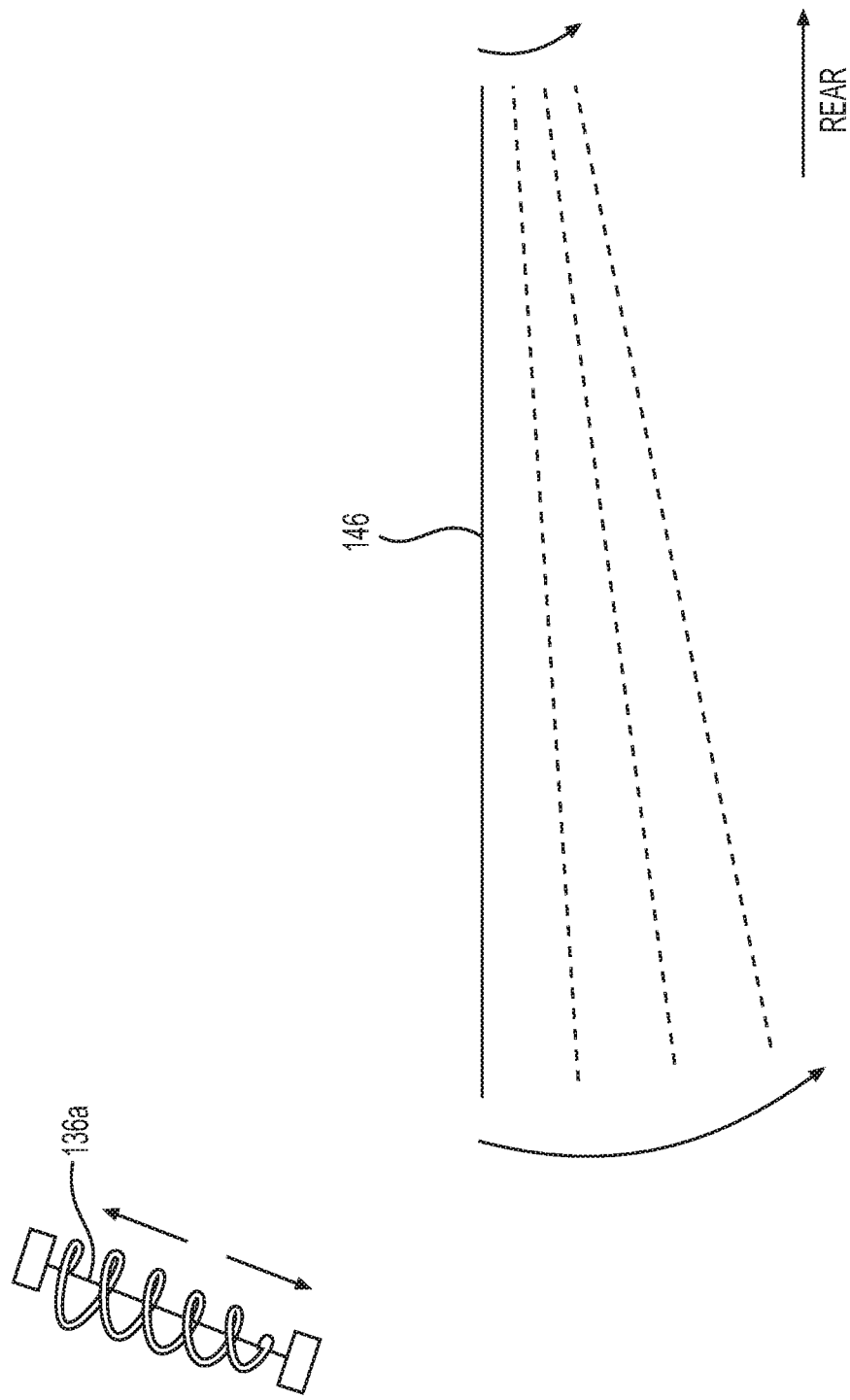

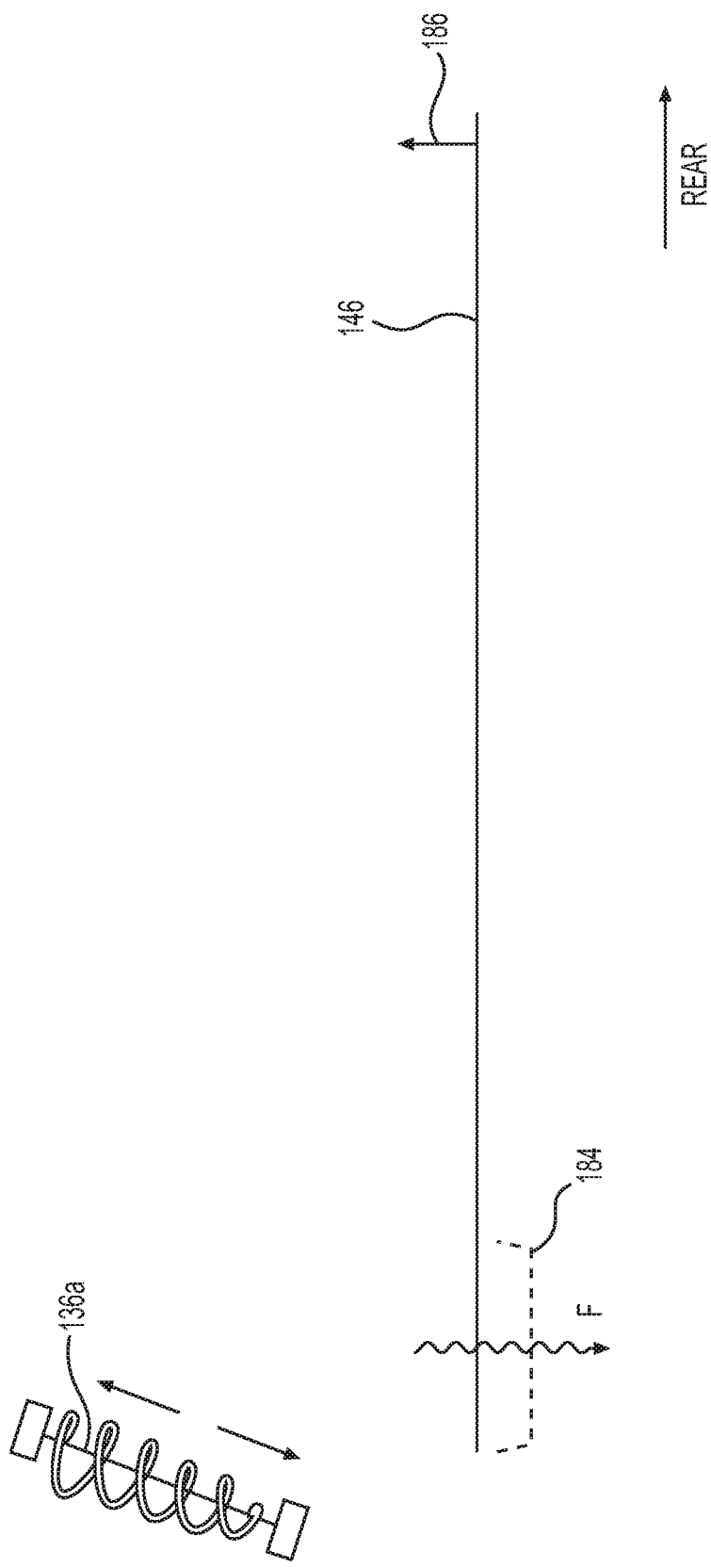

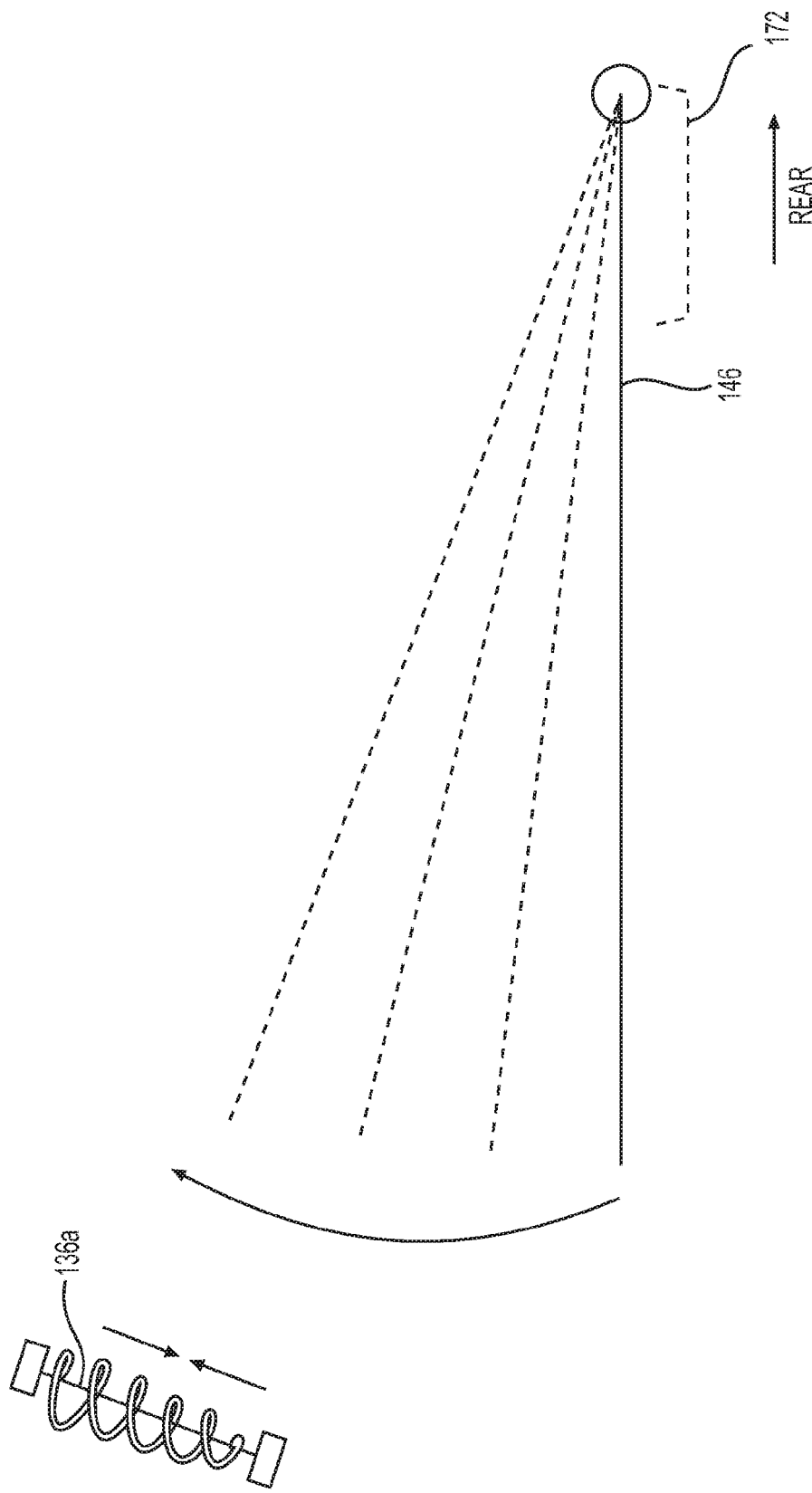

TRACK SYSTEM FOR ATTACHMENT TO A VEHICLE

CROSS-REFERENCE

The present application claims priority to U.S. Provisional Patent Application Ser. No. 62/321,420, filed Apr. 12, 2016, entitled "Anti-Rotation System for a Traction Assembly."

TECHNICAL FIELD

The present technology relates to track systems for attachment to a vehicle.

BACKGROUND

All-Terrain Vehicles ("ATV's") are conventionally are four-wheeled off-road vehicles. Given that wheels are do not provide optimal traction on certain terrain types, e.g. mud, snow, sand, etc., track systems were developed to be used on ATV's in place of the wheels. The ATV's, however, including their frames, suspensions, and fairings, were designed for having wheels as ground-contacting elements, and not for having tracks. Wheels are circular in shape (and thus when rotated maintain the same shape—and are designed to be rotated in use), and are generally smaller than track systems.

Tracks systems are typically triangular in shape (and are not designed to be rotated when in use) and are generally larger than wheels. Thus, on some ATV's, the substitution of a track system for a wheel, requires a structural element to restrict the movement of the track system, to prevent rotation and to limit the movement of the track system in view of the suspension travel of the vehicle (which was designed for a wheel) to prevent the track system or the track of the track system from coming into contact with parts of the vehicle.

Since their creation, track systems have also been adapted for use with vehicles other than ATVs, such as Utility Task Vehicles (also referred to as "UTV", or "Side-by-Side" vehicles), and trucks. In such uses, similar considerations apply and similar limiting assemblies may be used.

Devices used to limit rotation of the track systems are sometimes referred to in the art as "anti-rotation" or "limiting" assemblies.

An example of such a track system and limiting assembly can be found in commonly owned U.S. Pat. No. 8,312,945. The '945 patent teaches a limiting assembly that prevents excessive rotation of a track system about the axle onto which the track system is mounted, thereby preventing the track system from contacting and ultimately damaging other components of the vehicle.

The limiting assembly of the '945 patent generally forms a trapezoid or a parallelogram with the suspension of the vehicle. Due to the generally trapezoidal configuration of the limiting assembly, the stabilizing rod of the limiting assembly will maintain the terrain-contacting patch ("contact patch") of the track substantially parallel to the ground at all times, and that, substantially independently of the position of the suspension. The limiting assembly also allows for limited rotation of the track system about the axle, thereby allowing the track system to better follow the ground and thereby provide a smoother ride for the operator of the vehicle.

While existing track systems (such as those described in the '945 patent) are suitable for their intended purpose, improvements to such systems may be desirable.

SUMMARY

It is thus an object of the technology taught by this document ("the present technology") to improve on the prior art.

The creators of the present technology have discovered that, in some cases, existing track systems do not provide optimal performance, for example on certain terrain types and/or in certain situations. For example, the creators have found that improvements to vehicle acceleration and hill climbing characteristics provided by existing track systems can be made by applying a torque to the track system frame, at least in certain situations.

In addition, the vehicle's ability to extricate itself from snow or mud (for example), by travelling in reverse can also be improved by applying a torque to the track system frame, at least in certain situations.

Therefore, in one aspect, the present technology provides a track system for attachment to a vehicle, the vehicle having: I) a vehicle chassis having a front portion, a rear portion, a left side, and a right side; II) a rear suspension having a swing arm attached to the rear portion of the vehicle chassis, the swing arm being moveable between a compressed-suspension position and an extended-suspension position; III) an engine supported by the vehicle chassis for providing motive power to propel the vehicle; and IV) a rear axle supported by the swing arm and being in driven connection with the engine.

The track system includes: a) a track system frame being pivotably attachable to the swing arm about the rear axle, the track system frame having an upper frame portion and a ground-facing frame assembly, the ground-facing frame assembly having a leading idler wheel assembly and a trailing idler wheel assembly attached thereto, the ground-facing frame assembly having a longitudinal angular position relative to the vehicle chassis when the track system frame is pivotably attached to the swing arm; b) a drive sprocket being in driven connection with the rear axle when the track system frame is pivotably attached to the swing arm; c) an endless track mounted around the drive sprocket, the leading idler wheel assembly, and the trailing idler wheel assembly, the endless track being in driven connection with the drive sprocket; and d) a dynamic traction device.

The dynamic traction device has: i) a first elongate portion having a first distal end, and ii) a second elongate portion having a second distal end opposed to the first distal end, the second elongate portion being movable relative to the first elongate portion between a retracted position and an extended position, the second elongate portion being biased toward the retracted position, the first and second distal ends being closer together in the retracted position than in the extended position.

The second elongate portion is biased toward the retracted position by an effective biasing factor. The effective biasing factor is the strength with which the second elongate portion is biased toward its retracted position, minus friction and other losses arising from the mechanical nature of the dynamic traction device.

When A) the track system frame is pivotably attached to the swing arm, B) the drive sprocket is in driven connection with the rear axle, C) the first distal end is pivotably attached to the vehicle chassis at a first attachment point, and D) the second distal end is pivotably attached to the track system frame at a second attachment point, the first attachment point and the second attachment point are located with respect to the vehicle chassis and the track system frame such that when the vehicle is lifted off terrain, during at least a part of a movement of the swing arm from the compressed-suspension position toward the extended-suspension position, the dynamic traction device applies a torque to the track system frame about the rear axle and thereby changes the longitudinal angular position of the ground-facing frame assembly counter-clockwise relative to the left side of the vehicle chassis.

In summary, the track system (and its various components) may be constructed such that the track system transfers more of the vehicle and/or driving forces from the vehicle into the rear end of the track system during acceleration of the vehicle and/or when the vehicle drives up from a flat terrain onto an inclined terrain.

The track system (and its various components) may also be constructed such that the track system may cause the rear end of the track system to lift off the terrain when the vehicle applies a torque to the track system in reverse (i.e. to assist in moving the vehicle in reverse, e.g. when the vehicle is stuck in snow or mud).

In this document, the longitudinal angular position of the ground-facing frame assembly is a variable used to describe the movements of the ground-facing frame assembly relative to the vehicle chassis (for example, as shown in FIGS. 7A, 8A, 9, and 10). Particular relationships between the positions of the vehicle swing arm or other components of the vehicle and the longitudinal angular positions of the track system while the vehicle is lifted off terrain are referred to as "movement profiles". Examples of movement profiles of various embodiments of the track system are given in FIGS. 7A, 8A, 9, and 10.

Positive (+) changes (in degrees) of the longitudinal angular position are defined to be in the clockwise direction relative to the left side of the vehicle chassis. Negative (−) changes (in degrees) of the longitudinal angular position are defined to be in the counter-clockwise direction relative to the left side of the vehicle chassis.

For simplicity, the reference point for the longitudinal angular position has been chosen as the vehicle chassis portion 102a. That is, for the purposes of this document, the longitudinal angular position is defined as the number of degrees of tilt (which is not necessarily about a single point in space, as shown in FIGS. 7A, 8A, 9, and 10), either in the positive (clockwise 176) or in the negative (counter-clockwise 174) direction, of the ground-facing frame assembly away from a horizontal plane passing through the vehicle chassis portion 102a, as shown in FIGS. 2 and 3.

However, the vehicle chassis portion 102a (as opposed to any other suitable part of the vehicle) was chosen for convenience only. Any other suitable portion of the vehicle could have been chosen as the reference point for the longitudinal angular position of the ground-facing frame assembly of the track system.

Further, in the embodiment of FIGS. 1 to 3, changes of the longitudinal angular positions of the ground-facing frame assemblies of the rear track systems do not occur when the vehicle drives on flat horizontal terrain (i.e. they may occur as a result of irregularities of terrain), even though the swing arm may move (or example, as a result of acceleration and deceleration) between the compressed-suspension position and the extended-suspension position. This is the case, at least in part, due to the weight of the vehicle pressing down onto the rear track systems of the vehicle.

However, it has been found by the creators of the present technology that the changes of the longitudinal angular position of the ground-facing frame assemblies of the rear track systems that happen while the vehicle is lifted off terrain, as described in this document, may bring about one or more performance advantages when the vehicle is driven on terrain.

In one aspect, the changes of the longitudinal angular positions of the ground-facing frame assemblies of the rear track systems, even though they may not occur when the vehicle is driven on terrain (for example, when the terrain is horizontal and flat), may bring about the one or more vehicle performance advantages at least in part by changing, in some conditions as described later in this document, how the track systems transfer into terrain at least parts of at least some of the forces transferred into the track systems when the vehicle is in use. Examples of such forces include the weight of the vehicle and the driving forces from the vehicle's engine(s) applied to the track systems.

The claims and some other parts of the specification of this document are written in terms of the vehicle being lifted off terrain (as, for example, schematically shown by reference numeral 100a in FIG. 7A). This is done to remove the interactions between the tracks of the track systems and terrain that would take place while the vehicle is in use, because at least some of the interactions would not relate to the present technology.

The artificial environment of the vehicle being lifted off terrain may, at least in some cases, allow a person skilled in the art to determine whether or not an embodiment of the technology described in this document is present on a given vehicle. It will be appreciated by those skilled in the art that lifting a vehicle off terrain, as the term is used herein, will require securing the vehicle in place when it is lifted off terrain to permit for the creation of the suspension and swing arm movements described in the claims and the rest of the specification, in order to produce the various resulting movements of the track system(s) of the vehicle. The various movements of the suspension and the swing arm of the vehicle may be brought about by, for example, compressing the suspension and the swing arm against the vehicle chassis.

For the purposes of this application, the term "force transfer area" for a given force is the area on the endless track that is at the relevant time in contact with terrain via which area at least a part of the given force is transferred into the terrain.

For the purposes of this application, the term "supported by" in relation to various parts may include both one part being directly supported by the part by which it is supported (in the sense of the two parts being in contact with each other), and the one part being indirectly supported by the part by which it is supported (in the sense of there being intermediate parts connecting the two parts).

For the purposes of this application, the terms referring to a part moving "toward" a position, and being biased "toward" a position, refer to the direction of the movement and biasing of the part, and include both the cases where the part may move in the direction of the position but stop short of the position, and the cases where the part moved to (i.e. into) the position.

Thus, according to these definitions, in some embodiments of the track system, when the vehicle is lifted off terrain, during at least a part of a movement of the swing arm from the extended-suspension position toward the compressed-suspension position, the dynamic traction device applies a torque to the track system frame about the rear axle and thereby changes the longitudinal angular position of the ground-facing frame assembly clockwise relative to the left side of the vehicle chassis. In some cases and for some vehicles, this configuration may improve acceleration and incline terrain driving ability of the vehicle.

In some embodiments of the track system, when the vehicle is lifted off terrain, during at least a part of a movement of the swing arm from the extended-suspension position toward the compressed-suspension position, the dynamic traction device applies a torque to the track system frame about the rear axle and thereby changes the longitudinal angular position of the ground-facing frame assembly clockwise, relative to the left side of the vehicle chassis, by one to five degrees. In some cases and for some vehicles, this configuration may improve acceleration and incline terrain driving ability of the vehicle.

In some embodiments of the track system, i) when the vehicle is stationary on flat horizontal terrain, the swing arm is in a neutral position that is between the compressed-suspension position and an extended-suspension position; and ii) when a downward force is applied to the vehicle chassis such that the vehicle chassis moves downward and thereby moves the swing arm from the neutral position toward the toward the compressed-suspension position, during at least a part of this movement of the swing arm, the dynamic traction device applies a clockwise torque to the track system frame about the rear axle relative to the left side of the vehicle. In some cases and for some vehicles, this configuration may improve acceleration and incline terrain driving ability of the vehicle.

In some embodiments of the track system, when i) the vehicle is stationary on flat horizontal terrain, ii) the swing arm is a neutral position that is between the compressed-suspension position and an extended-suspension position; and iii) an upward force is applied to the vehicle chassis such that the vehicle chassis moves upward and thereby moves the swing arm from the neutral position toward the extended-suspension position, during at least a part of this movement of the swing arm, the dynamic traction device applies a counter-clockwise torque to the track system frame about the rear axle relative to the left side of the vehicle. In some cases and for some vehicles, this configuration may improve an ability of the vehicle in reversing out of being stuck in mud or snow.

In some embodiments of the track system, while the vehicle is accelerating in a forward direction over uneven terrain, the dynamic traction device applies substantially a clockwise-only torque to the track system frame about the rear axle relative to the left side of the vehicle chassis. In some cases and for some vehicles, this configuration may improve acceleration and incline terrain driving ability of the vehicle.

In some embodiments of the track system, the trailing idler wheel assembly extends rearward of the rear axle by a distance of between 45 centimeters to 155 centimeters inclusive. In some cases and for some vehicles, this configuration may improve acceleration and incline terrain driving ability of the vehicle.

In some embodiments of the track system, when the vehicle is on terrain and the engine applies a clockwise torque to the rear axle, relative to the left side of the vehicle, the dynamic traction device applies a counter-clockwise torque to the track system frame about the rear axle relative to the left side of the vehicle. In some cases and for some vehicles, this configuration may improve an ability of the vehicle in reversing out of being stuck in mud or snow.

In some embodiments of the track system, i) when the vehicle is on flat horizontal terrain, the second elongate portion is in a neutral position; and ii) the second elongate portion is biased from the neutral position to the retracted position.

In some embodiments of the track system, i) when the ground-facing frame assembly is in a range of three to ten degrees below a horizontal plane, the second elongate portion is in the retracted position; and ii) when the ground-facing frame assembly is in a range of fifteen to thirty degrees above the horizontal plane, the second elongate portion is in the extended position. In some cases and for some vehicles, this configuration may improve an ability of the vehicle of traversing undulating terrain.

In some embodiments of the track system, i) when the ground-facing frame assembly is in a range of fifteen to thirty degrees below a horizontal plane, the second elongate portion is in the retracted position; and ii) when the ground-facing frame assembly is in a range of fifteen to forty degrees above the horizontal plane, the second elongate portion is in the extended position. In some cases and for some vehicles, this configuration may improve an ability of the vehicle of traversing undulating terrain.

It should be noted that, depending on the embodiment of the vehicle and the track system, movements the track system may include one or both of a forward 128 longitudinal translation component (shown with reference arrow 128 on FIG. 1B) and a rearward longitudinal translation component (shown with reference arrow 130 on FIG. 1B).

In some embodiments of the track system, i) the dynamic traction device includes a cylinder, the cylinder having a first end and a second end opposite the first end; ii) the first elongate portion extends from the first end of the cylinder away from the second end of the cylinder; iii) the second elongate portion is slidable into the cylinder; and iv) the second elongate portion extends from the second end of the cylinder away from the first end of the cylinder. In some cases, this configuration may improve at least some durability characteristics of the track system.

In some embodiments of the track system, i) the dynamic traction device includes: A) a resilient stopper disposed inside the cylinder proximate the first end of the cylinder, and B) a spring disposed inside the cylinder proximate the second end of the cylinder; ii) the second elongate portion includes a head portion sized to engage the spring in compression; iii) the head portion is opposite the second distal end of the second elongate portion; and iii) the head portion is disposed between the resilient stopper and the spring. In some cases, this configuration may improve at least some durability characteristics of the track system.

In some embodiments of the track system, i) the resilient stopper is a rubber stopper; ii) the spring is a helical spring defining an aperture; and iii) a part of the second elongate portion is disposed inside the aperture of the spring. In some cases, this configuration may improve at least some durability characteristics of the track system.

In some embodiments of the track system, the first elongate portion is substantially collinear with the second elongate portion at all times while the second elongate portion moves between its retracted position and its extended position.

In some embodiments of the track system, the dynamic traction device is disposed within a width dimension defined by outer lateral edges of the track. In some cases, this configuration may improve the vehicle's performance in driving in deep snow or mud.

Implementations of the present technology each have at least one of the above-mentioned object and/or aspects, but do not necessarily have all of them. It should be understood that some aspects of the present technology that have resulted from attempting to attain an above-mentioned object may not satisfy this object and/or may satisfy other objects not specifically recited herein.

For ease of understanding, FIGS. 5 and 6 schematically show movements of some prior art track systems during compression of prior art suspension systems onto which the prior art track systems are mounted, which movements may occur while the track systems are lifted off terrain (in order to free the endless tracks of the track systems from contact with the terrain). The frames of the prior art track systems are schematically shown with lines 500 and 600 in FIGS. 5 and 6, respectively.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings.

Due to the nature of the present technology, the drawings included with the present specification are schematic in nature, and do not represent the precise positions of the various components relative to each other. This is due to the fact that even small changes in the relative positions of the various components may have significant impact on the operation of the present technology. It is intended that persons skilled in the art to whom the present specification is addressed will use the description and the schematics in concert with their common general knowledge to make and use the various aspects of the present technology.

Figure 1A:
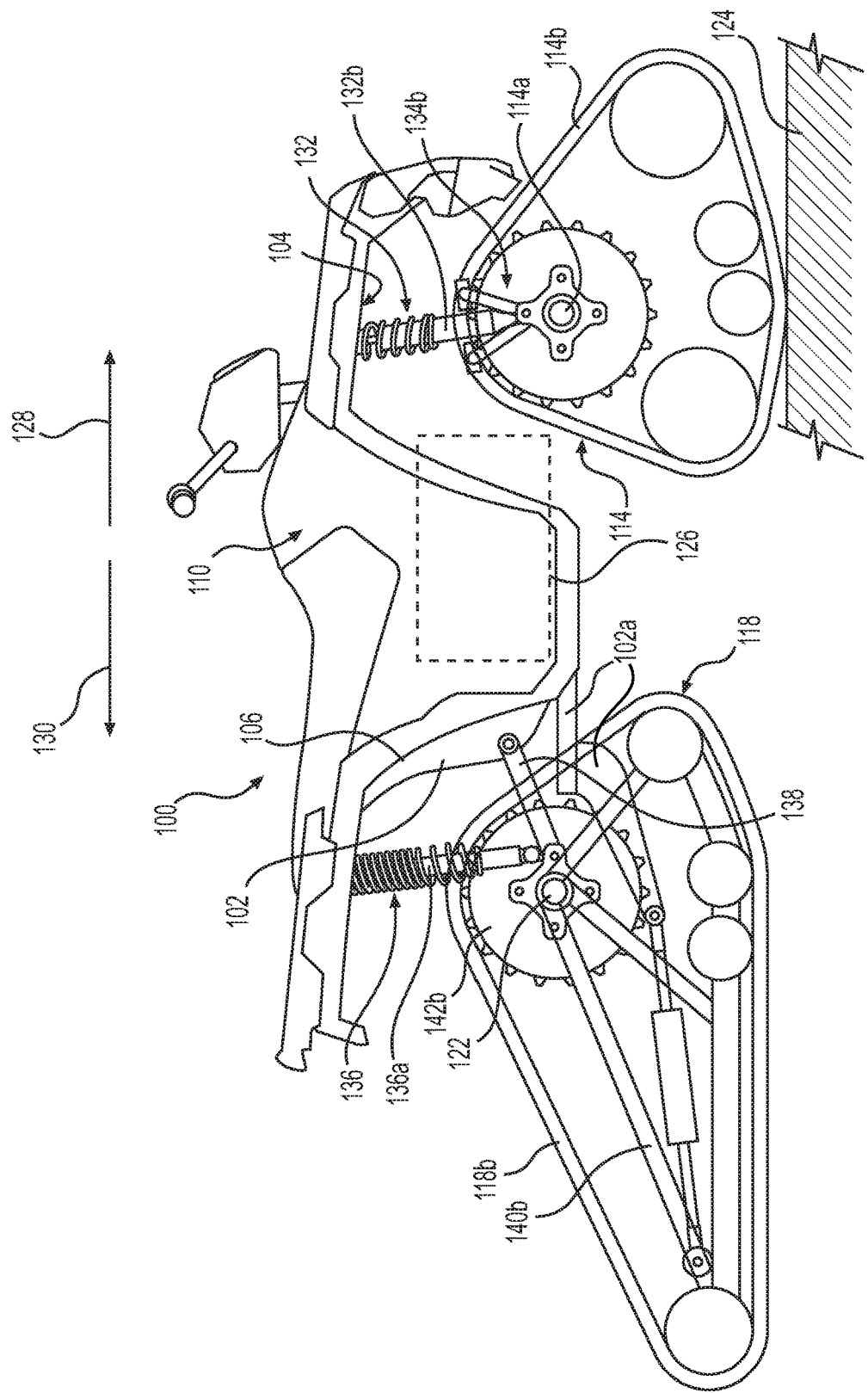

Also, due to the relatively small magnitudes of movement of some of the components of the present technology, some of the movements illustrated by the drawings and schematics included with the present specification have been exaggerated, to make them more clearly visible.

Also, to maintain clarity of the interconnections of the various components of the vehicle and track systems shown in drawings, some parts of the vehicle have been omitted from the drawings, and some parts of the vehicle and track systems have been shown transparent to preserve a view of other parts that may otherwise be at least partially hidden on the drawings.

Figure 1B:
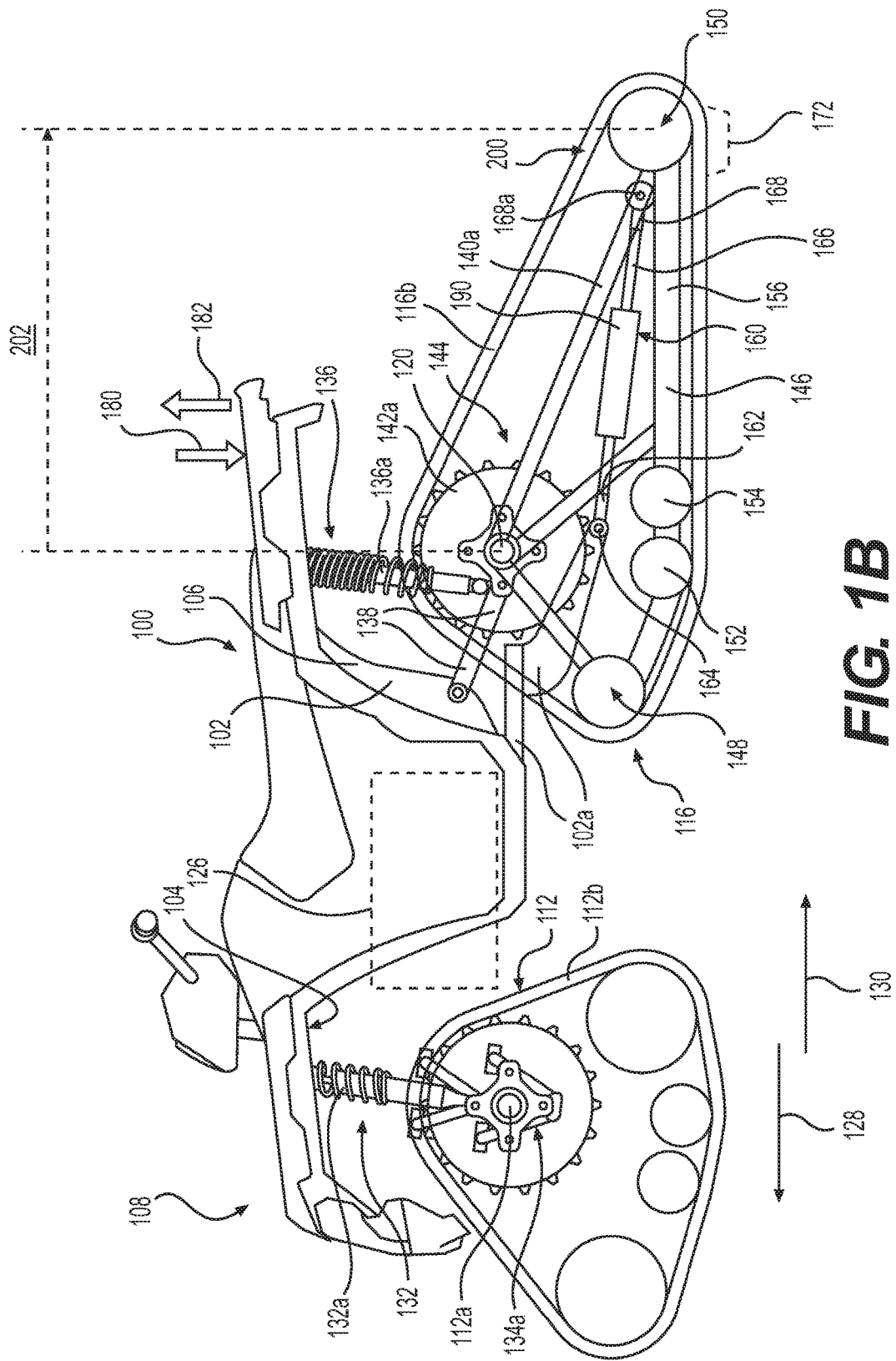
Figure 3:
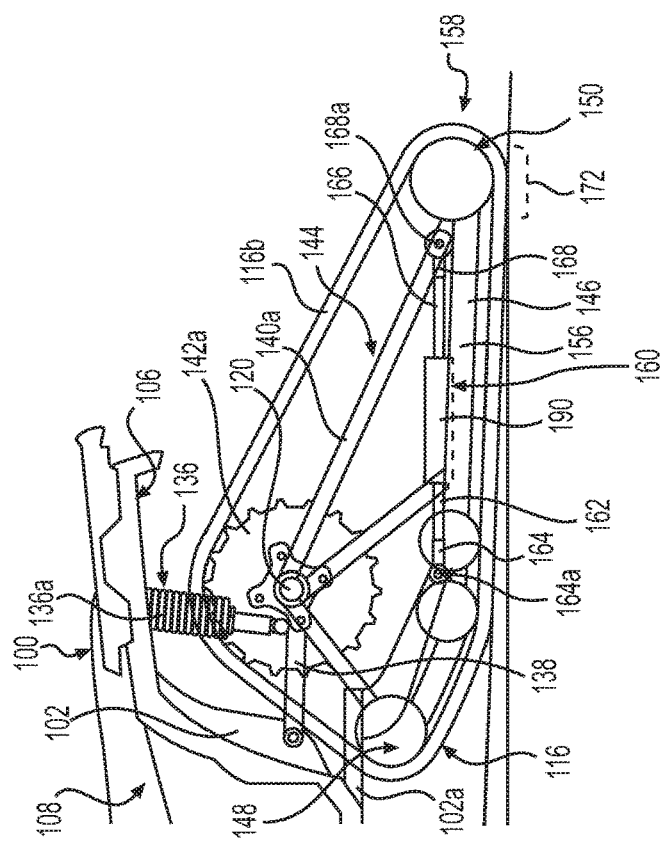
Figure 2:
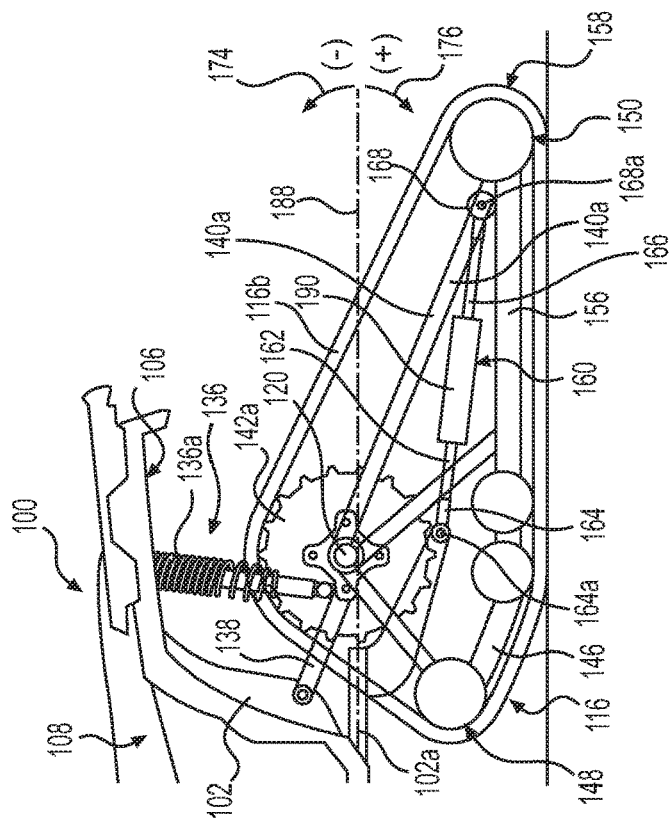
Figure 4A:
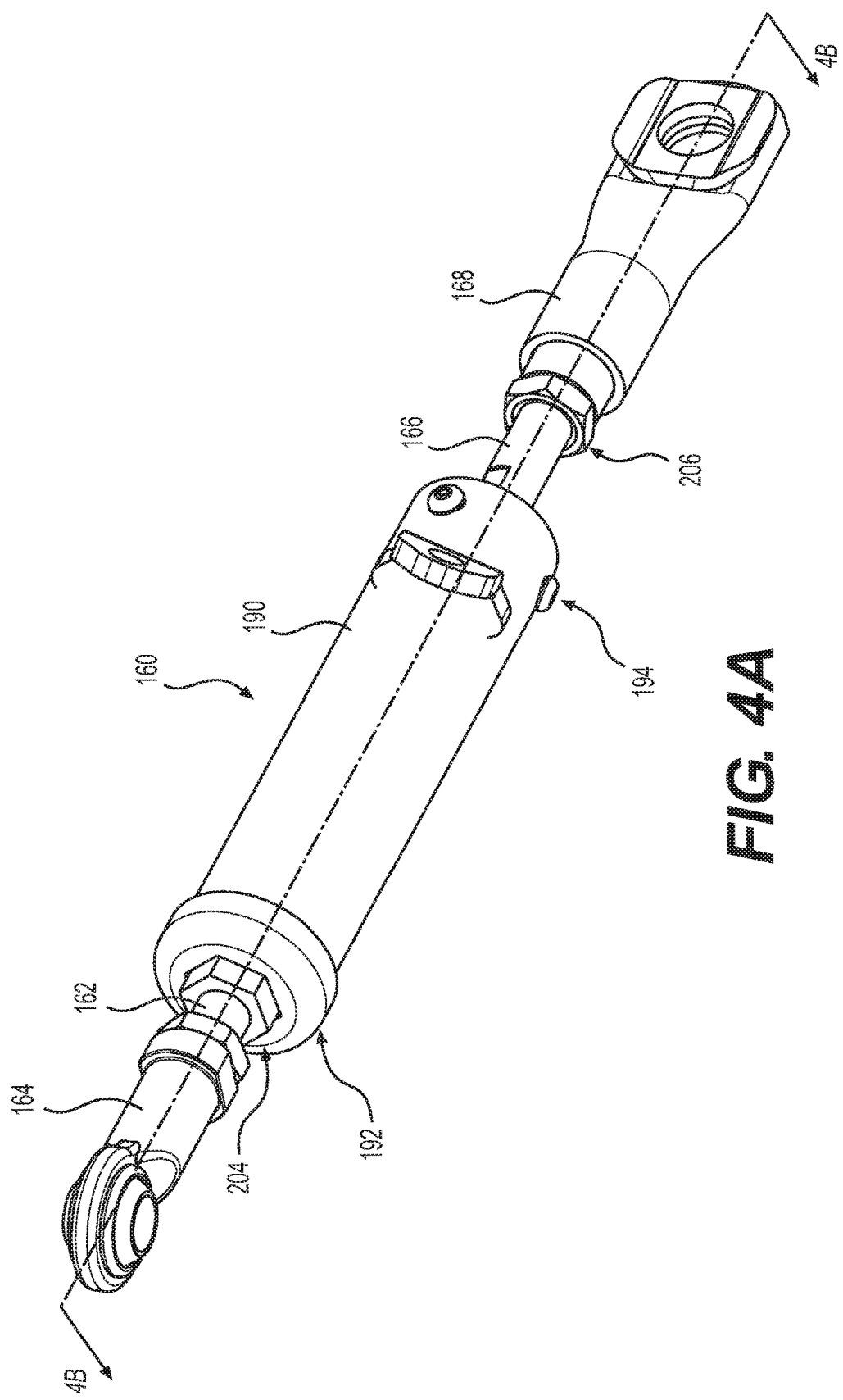
Figure 4B:
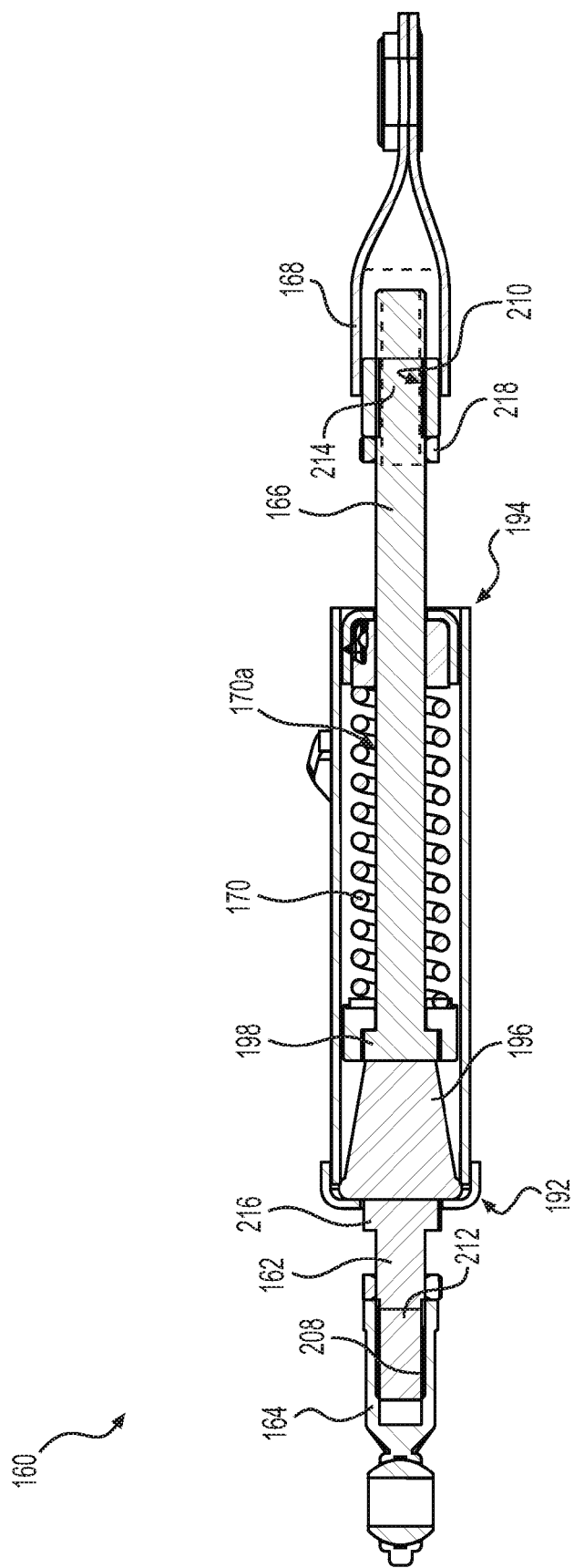
Figure 6:
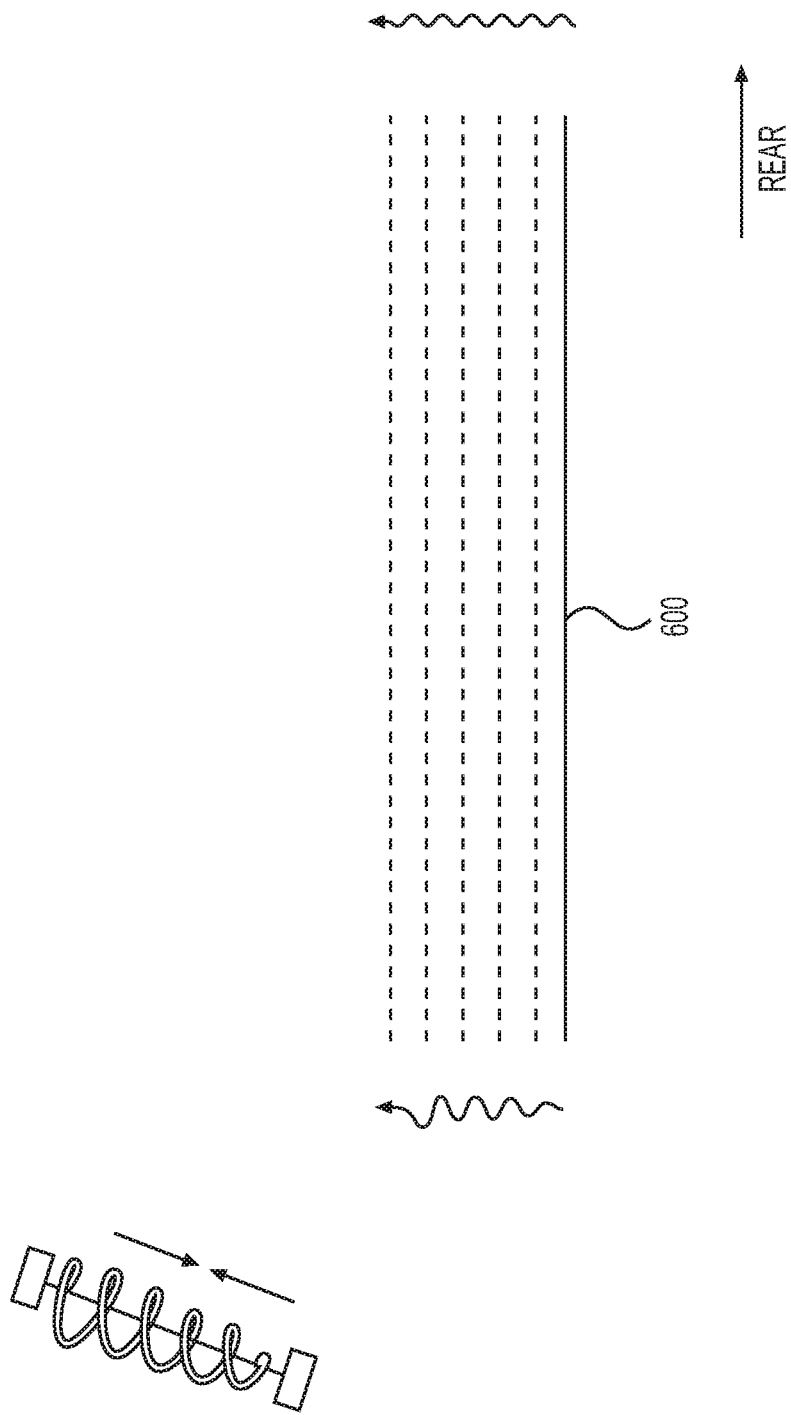
Figure 10:
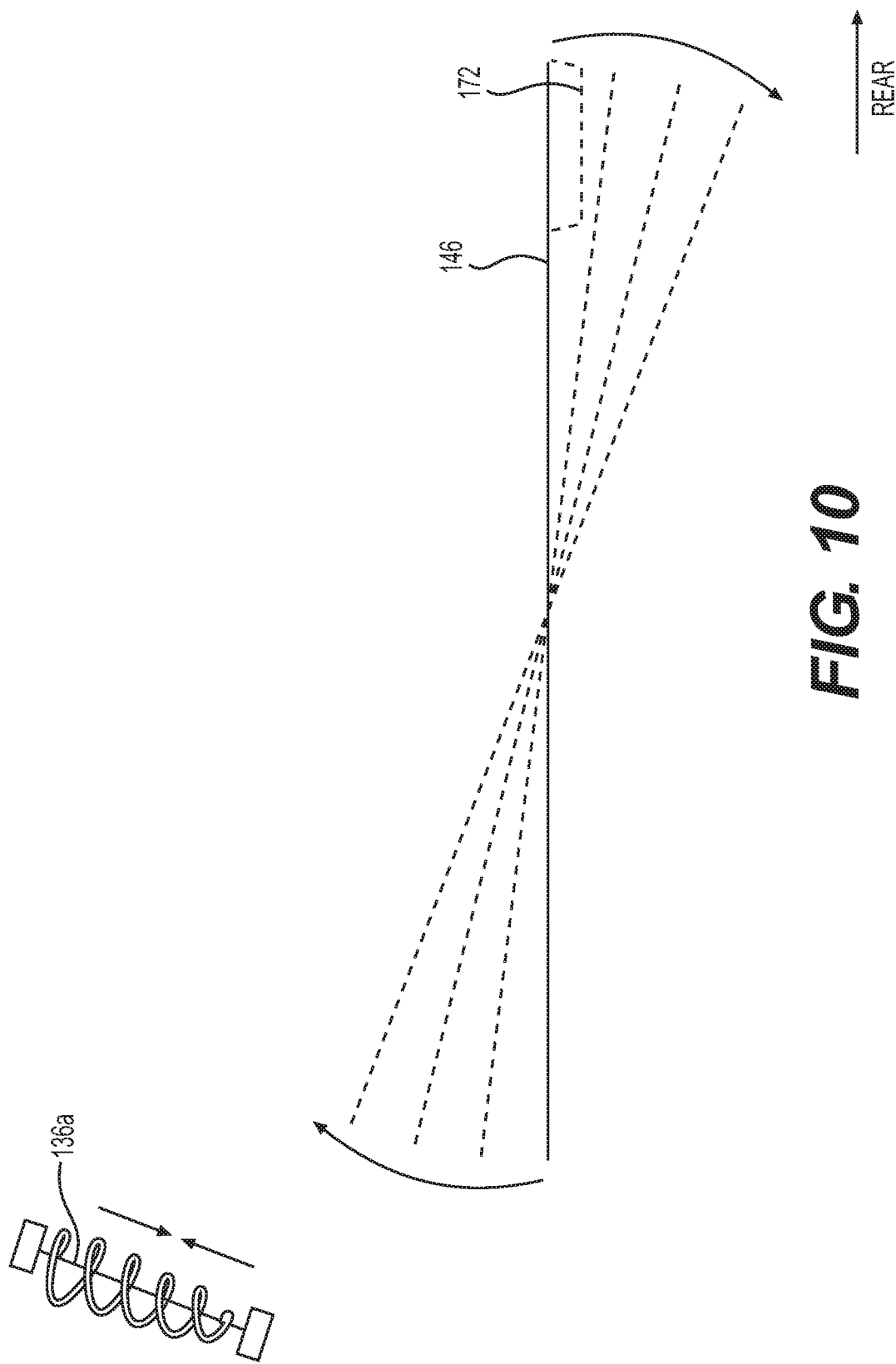

In the drawings:

FIG. 1A is a side view of a right side of a vehicle having a rear suspension, a rear left track system and the rear left track system having a dynamic traction device, according to a first embodiment;

FIG. 1B is a side view of a left side of the vehicle of FIG. 1A;

FIG. 2 is a partial view of the left side of the vehicle of FIGS. 1A and 1B, the rear suspension of the vehicle being in an extended state and the rear left track system having a longitudinal angular position of a first magnitude;

FIG. 3 is a partial view of the left side of the vehicle of FIGS. 1A, 1B and 2, the rear suspension of the vehicle being in a compressed state and the rear left track system having a longitudinal angular position of a second magnitude, the second magnitude being two degrees larger than the first magnitude;

FIG. 4A is an isometric view of the dynamic traction device of the vehicle of FIGS. 1 to 3, according to a given embodiment;

FIG. 4B is a section view of the dynamic traction device of FIG. 4A, taken along reference lines 4B-4B;

FIG. 5 is a schematic illustrating movement of a first example of a prior art rear left track assembly of a tracked vehicle, which movement occurs during compression of the rear suspension of the prior art tracked vehicle from its neutral position while the vehicle is lifted off terrain;

FIG. 6 is a schematic illustrating movement of a second example of a prior art rear left track assembly of a tracked vehicle, which movement occurs during compression of the rear suspension of the prior art tracked vehicle from its neutral position while the vehicle is lifted off terrain;

FIG. 7A is a schematic illustrating movement of the rear left track assembly of FIGS. 1 to 3, during at least a part of a compression of the rear suspension from its neutral position while the vehicle is lifted off terrain;

FIG. 7B is a schematic illustrating a force applied by the rear left track assembly of FIGS. 1 to 3, during at least a part of a compression of the rear suspension from its neutral position, while the vehicle is on flat horizontal terrain;

FIG. 8A is a schematic illustrating movement of the rear left track assembly of FIGS. 1 to 3, during at least a part of an extension of the rear suspension from its neutral position while the vehicle is lifted off terrain;

FIG. 8B is a schematic illustrating a force applied by the rear left track assembly of FIGS. 1 to 3, during at least a part of an extension of the rear suspension from its neutral position, while the vehicle is on flat horizontal terrain;

FIG. 9 is a schematic illustrating movement of another embodiment of the rear left track assembly of the vehicle of FIGS. 1 to 3, during at least a part of a compression of the rear suspension from its neutral position while the vehicle is lifted off terrain; and FIG. 10 is a schematic illustrating movement of yet another embodiment of the rear left track assembly of the vehicle of FIGS. 1 to 3, during at least a part of a compression of the rear suspension from its neutral position while the vehicle is lifted off terrain.

DETAILED DESCRIPTION

Referring to FIGS. 1A & 1B, there is shown a vehicle 100, specifically an ATV, being an embodiment of the present technology. It is to be expressly understood that the vehicle 100 is merely an implementation of the present technology. Thus, the description thereof that follows is intended to be only a description of an illustrative example of the present technology. This description is not intended to define the scope or set forth the bounds of the present technology. In some cases, what are believed to be helpful examples of modifications that may occur in other embodiments may also be set forth below.

This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology.

As a person skilled in the art would understand, this is likely not the case. In addition it is to be understood that vehicle 100 may be in certain instances a simple implementation of the present technology, and that where such is the case it has been presented in this manner as an aid to understanding. As persons skilled in the art would understand, various implementations of the present technology may be of a greater complexity.

The vehicle 100 has a vehicle chassis 102. The vehicle chassis 102 has a front portion 104, a rear portion 106, a left side 108, and a right side 110. FIG. 1 shows the left side 108 of the vehicle 100 and the vehicle chassis 102.

The vehicle 100 is an ATV. The vehicle 100 has a front left track system 112, a front right track system 114, a rear left track system 116, and a rear right track system 118. The front track systems 112, 114 are supported by front axles 112*a*, 114*a* using suitable known mechanical connections. The rear left track system 116 is supported by a rear swing arm 136*a*.

The rear right track system 118 is supported by the rear swing arm 136*a* (described in more detail later in this document). The rear track systems 116, 118 are driven by rotation of rear axles 120, 122, to which they are interconnected using suitable known mechanical connections. The four track systems 112, 114, 116, 118 support the vehicle 100 on terrain 124 when the vehicle 100 is in use. Each of the four track systems has an endless track 112*b*, 114*b*, 116*b*, 118*b*, respectively, for transmitting driving forces into terrain 124.

The front right track system 114 is a mirror image of the front left track system 112. A description of the front left track system 112 corresponds to a description of the front right track system 114. The rear right track system 118 is a mirror image of the rear left track system 116. A description of the rear left track system 116 corresponds to a description of the rear right track system 118. Therefore, to avoid needless duplication, further description of the front right track system 114 and the rear right track system 118 is omitted.

The vehicle 100 has an engine 126 supported by the vehicle chassis 102 for providing motive power to propel the vehicle 100. The vehicle 100 has a rear left axle 120, and a rear right axle 122. The rear axles 120, 122 are in driven connection with the engine 126 for being rotated by the engine 126 for providing motive power to drive the vehicle 100 either forward 128, or in reverse 130, as illustrated by reference arrows 128 and 130, respectively, on FIGS. 1A and 1B.

The rear track systems 116, 118 are in driven connection with the engine 126 via the rear axles 120, 122. The drive train (not shown) of the vehicle 100 is a suitable known drive train that includes components suitable to enable drivability of the vehicle 100. In this embodiment, the drive train is a rear wheel/track drive (that is, the front axles are not driven by the engine 126).

It is contemplated that any other suitable drive train could be used, including, for example, a suitable known 4×4™ drive train (i.e. an "all-wheel/track drive" type drive train). Likewise, it is contemplated that any other ATV 100, or any other suitable vehicle 100 could be used.

For example, the vehicle 100 may have a single unitary rear axle (not shown), in which case each of the two rear track systems 116, 118 would be in driving connection with the single unitary rear axle. Likewise, the vehicle 100 may have a single unitary front axle (not shown), in which case each of the two front track systems 112, 114 would be in driving connection with the single unitary front axle. Other configurations are also possible.

The two front track systems 112, 114 are suitable known track systems. The front track systems 112, 114 may be implemented, for example, as described in commonly owned U.S. Pat. No. 7,870,914. The two rear track systems 116, 118 are described in more detail later in this document.

The vehicle 100 has a front suspension 132, of a suitable known A-arm type, attached to the front portion 104 of the vehicle chassis 102, and a rear suspension 136, of a suitable known swing arm type, attached to the rear portion of the vehicle chassis 102.

The front suspension 132 includes two (a left, and a right) front axles supported by the vehicle chassis 102 via the front A-arm suspension. The front right axle 114*a* is a mirror image of the front left axle 112*a*. Therefore, a description of the front left axle 112*a* corresponds to a description of the front right axle 114*a*. To avoid duplication, further description of the front right axle 114*a* is omitted.

The front suspension 132 includes a left shock absorber 132*a* and a right shock absorber 132*b*, of a suitable known type, attached between the front portion 104 of the vehicle chassis 102 and the A-arms 134*a*, 134*b* of the front suspension 132, respectively.

The rear suspension 136 includes a swing arm 138 attached to the rear portion 106 of the vehicle chassis 102. The swing arm 138 is moveable between a compressed-suspension position, an example of which is shown in FIG. 3, and an extended-suspension position, an example of which is shown in FIG. 2.

For the purposes of this document, the rear right axle 122 is a mirror image of the rear left axle 120. Therefore, a description of the rear left axle 120 corresponds to a description of the rear right axle 122. To avoid duplication, further description of the rear right axle 122 is omitted.

The rear suspension 136 includes a rear shock absorber 136*a*, of a known type, attached between the rear portion 106 of the vehicle chassis 102 and the swing arm 138. The rear shock absorber 136*a* is movable between a compressed position, an example of which is shown in FIG. 3, and an extended position, an example of which is shown in FIG. 2.

In some embodiments, the rear shock absorber 136*a* and/or the vehicle chassis 102 may include a suitable known travel-limiting assembly (not shown) to limit travel of the rear shock absorber 136*a* to prevent damage that may otherwise result from, for example, over-extension of the rear shock absorber 136*a* to or beyond its operating limits.

It is contemplated that the rear suspension 136 could have any other suitable configuration. It is contemplated that any other suitable suspension could be used, including a rear suspension that has more than one swing arm, and/or more than one shock absorber. For example, a vehicle could have a rear left swing arm (not shown) for supporting the rear left track system, and a rear right swing arm (not shown) for supporting the rear right track system. Likewise, such a vehicle may have a rear left shock absorber (not shown) attached between the vehicle chassis and the rear left swing arm, and a rear right shock absorber (not shown) attached between the vehicle chassis and the rear right swing arm.

When the vehicle 100 is fully fueled and is carrying no passengers and no cargo, the vehicle 100 is at its curb weight. When the vehicle 100 is stationary on flat horizontal terrain 124 (as shown in FIG. 1A) at its curb weight, the rear shock absorber 136*a* is in a neutral position, and the swing arm 138 is in a neutral position, shown in FIGS. 1A and 1B. In this position, the endless tracks 112*b*, 114*b*, 116*b*, 118*b* of the track systems 112, 114, 116, 118 contact the terrain 124.

When the swing arm 138 the in its neutral position, the swing arm 138 is positioned between the compressed-suspension position and the extended-suspension position. When the rear shock absorber 136*a* is in the neutral position, the rear shock absorber 136a is positioned between its compressed position and its extended position.

The rear left track system 116 is described next. In view of the symmetry of the vehicle 100 (the various parts on the left side 108 of the vehicle 100 being mirror images of corresponding parts on the right side 110 of the vehicle 100), the rear left track system 116 will be described further with the "rear left" portion of its name being omitted. This is done to avoid duplication. That is, the rear left track system 116 will be described simply as the "track system 116", because the description of the rear left track system 116 corresponds to a description of the rear right track system 118.

The track system 116 has a track system frame 140a and a drive sprocket 142a. The track system frame 140a is pivotably attached to the swing arm 138 about the rear left axle 120 via the drive sprocket 142a and the rear left axle 120. That is, in the embodiment of FIGS. 1A to 3, the track system frame 140a is pivotably attached to the swing arm 138 about the rear left axle 120 by being rotationally attached to the drive sprocket 142a, the drive sprocket 142a being rotationally supported by the swing arm 138. In this example, the drive sprocket 142a is fixedly attached to the rear left axle 120 to be driven (rotated) by rotation of the rear left axle 120. In other words, the drive sprocket 142a is in driven connection with the rear left axle 120.

It is contemplated that any other suitable combination of connections and arrangements between the drive sprocket 142a, the track system frame 140a, and the vehicle 100 could be used to pivotably attach the track system frame 140a about the swing arm 138. For example, the track system frame 140a could be pivotably attached to the swing arm 138 about the rear left axle 120 by being rotationally attached to the rear left axle 120. In this example, the track system frame 140a would still be said to be pivotably attached to the swing arm 138 about the rear left axle 10, because in use, the track system frame 140a would pivot about the rear left axle 120.

In some cases, the track systems of the present technology may be used to replace an existing wheel of a vehicle, which wheel is (prior to the retrofit) supported by a swing arm of the vehicle. In some cases, a vehicle could be manufactured with at least one swing arm and at least one track system of the present technology attached thereto, as the various possible attachments are described in this document.

For example, in a retrofit application, a wheel (not shown) supported by a swing arm (not shown) of a vehicle could be removed, thereby leaving the wheel hub (not shown) by which the wheel had been supported. The drive sprocket 142a would then be mounted onto the wheel hub instead of the wheel (for example by re-using the bolts that had secured the wheel to the wheel hub), to be rotated by rotation of the wheel hub. In such an application, the track system frame 140a may be supported by the swing arm by being rotationally mounted to the drive sprocket 142a.

In the context of the track system frame 140a, the term "pivotably attached" to the swing arm 138 means that, while the direct connection between the track system frame 140a and the rear left axle 120, if any, is rotational, when the vehicle 100 is in use, in use the track system frame 140a pivots relative to the swing arm 138 about the rear left axle 120 and therefore also pivots relative to the swing arm 138.

Further details of the track system 116 are described next.

The track system frame 140a has an upper frame portion 144 and a ground-facing frame assembly 146. In this embodiment, the ground-facing frame assembly 146 is fixedly attached to the upper frame portion 144. In other words, the track system frame 140a in this embodiment is a rigid frame 140a. It is contemplated that the track system 116 could have any other suitable track system frame. For example, the upper frame portion 144 could be sprung relative to the ground-facing frame assembly 146, via a suitable suspension, such as the suspension taught by the commonly owned U.S. Pat. No. 8,955,925 B2.

The ground-facing frame assembly 146 has a leading idler wheel assembly 148 and a trailing idler wheel assembly 150 attached thereto. In this embodiment, the leading idler wheel assembly 148 has two idler wheels 148 positioned transversely relative to each other to support the endless track 116b, and the trailing idler wheel assembly 150 has two idler wheels 150 positioned transversely relative to each other to support the endless track 116b.

It is contemplated that each of the leading idler wheel assembly 148 and the trailing idler wheel assembly 150 could be any suitable idler wheel assembly. For example, the leading idler wheel assembly 148 could include the mid-roller idler wheels 152, 154.

The ground-facing frame assembly 146 includes the mid-roller idler wheels 152, 154 and has two frame members 156 positioned transversely relative to each other to support the idler wheel assemblies 148, 150.

It is contemplated that the ground-facing frame assembly 146 could have any other suitable number of idler wheels and could have any other suitable configuration, including any other suitable number of frame members 156, or other components instead of the frame members 156. In this embodiment, the frame members 156 and the idler wheel assemblies 148, 150 are a known combination of frame members 156 and the idler wheel assemblies 148, 150.

An endless track 116b is mounted around the drive sprocket 142a, the leading idler wheel assembly 148, and the trailing idler wheel assembly 150. The endless track 116b is in driven connection with the drive sprocket 142a.

The track system 116 includes a dynamic traction device 160. The dynamic traction device 100 has a first elongate portion 162 having a first distal end 164, and a second elongate portion 166 having a second distal end 168 opposed to the first distal end 164. The first distal end 164 is pivotably attached to the vehicle chassis 102 at a first attachment point 164a. The second distal end 168 is pivotably attached to the track system frame 140a at a second attachment point 168a.

The second elongate portion 166 is movable relative to the first elongate portion 162 between a retracted position and an extended position. The second elongate portion 166 is biased toward the retracted position. The first and second distal ends 164, 168 of the first and second elongate portions 162, 166 are closer together in the retracted position than in the extended position.

The second elongate portion 166, and thus the dynamic traction device 160, is biased toward its retracted position by an effective biasing factor. In the example of FIGS. 1 to 3, the second elongate portion 166 is biased toward its retracted position via a spring 170. It is contemplated that any other suitable biasing mechanism, such as a compressed gas mechanism, could be used.

The particular embodiment of the dynamic traction device 160 of the track system 116 of FIGS. 1A to 3 is described next, with reference to FIGS. 4 to 6.

In this embodiment, the dynamic traction device 160 includes a cylinder 190. The cylinder 190 has a first end and a second end 194 opposite the first end 192. The first elongate portion 162 extends from the first end 192 of the cylinder 190 away from the second end 194 of the cylinder 190. The second elongate portion 166 is slidable in the cylinder 190. The second elongate portion 166 extends from the second end 194 of the cylinder 190 away from the first end 192 of the cylinder 190.

A resilient member 196 is disposed inside the cylinder 190 proximate the first end 192 of the cylinder 190. A spring 170 is disposed inside the cylinder 190 proximate the second end 194 of the cylinder 190. The second elongate portion 166 includes a head portion 198 sized to engage the spring 170 in compression. The head portion 198 is opposite the second distal end 168 of the second elongate portion 166. The head portion 198 is disposed between the resilient member 196 and the spring 170.

In this implementation, the head portion 198 is sized to have a diameter that is larger than the diameter of the aperture 170a in the spring 170 so that when the second elongate portion 166 slides outward of the cylinder 190, the head portion 198 compresses the spring 170. When the second elongate portion 166 slides inward into the cylinder 190, its motion is limited by the resilient member 196.

In this embodiment, when the second elongate portion 166 is in its retracted position, as shown in FIG. 4B, the head portion 198 contacts the resilient stopper 196. In the retracted position the spring 170 applies a force on the head portion 198.

It is contemplated that in some embodiments, the spring 170, or other biasing mechanism, may be selected such that when the second elongate portion 166 is in its retracted position, the spring 170, or other biasing mechanism, no longer applies a force on the second elongate portion 166. Such embodiments may be used, for example, to provide some vehicles 100 with an extended range of motion of the track systems 116, 118 clockwise 176.

In the embodiment of FIGS. 1 to 4B, the resilient stopper 196 is a rubber stopper 196, made from a known suitable rubber selected to provide approximately exponential resistance to compression, relative to the degree of compression of the rubber. In this embodiment, the spring 170 is a known helical spring defining an aperture 170a along its length. A part of the second elongate portion 166 is disposed inside the aperture 170a of the spring 170. It is contemplated that the dynamic traction device 160 could have more than one spring 170.

In this embodiment, the first elongate portion 162 has a first length adjustment mechanism 204. The second elongate portion 166 has a second length adjustment mechanism 206. Each of the length adjustment mechanisms 204 is implemented as a combination of a thread 208, 210 in each of the respective distal ends 164, 168, a matching thread 212, 214 in each of the elongate portions 162, 166, and nuts 216, 218 for setting respective ones of the pairs of threads 208, 212, and 210, 214 into particular positions relative to each other. It is contemplated that any other suitable length adjustment mechanisms could be used.

In one example, the length adjustment mechanisms 204, 206 could be used to adjust the operation of the dynamic traction device 160 once the track system 116 is installed onto a vehicle 100.

In another aspect, both the first elongate portion 162 and the second elongate portion 166 are removable from the cylinder 194 and from their respective distal ends 164, 168, for replacement with different elongate portions having different lengths. In one aspect, this may allow to change the performance of a given dynamic traction device 160 on a given vehicle 100 to a different performance on the given vehicle 100.

In the embodiment of FIGS. 1 to 3, the lengths of the first and second elongate portions 166, 168, and the dimensions of the other components of the dynamic traction device 160 are selected such that when the ground-facing frame assembly 146 is at five degrees below a horizontal plane (shown with reference numeral 188 in FIGS. 2 and 3), the second elongate portion 166 is in its retracted position. Also, when the ground-facing frame assembly 146 is at twenty-five degrees above the horizontal plane 188, the second elongate portion 166 is in its extended position.

In this embodiment, when the vehicle 100 is stationary on flat horizontal terrain 124, the second elongate portion 166 of the dynamic traction device 160 is in a neutral position. The length of the spring 170 and lengths of the first and second elongate portions 166, 168 are selected such that the second elongate portion 166 is biased to (and not just "toward", which may be the case in other embodiments) the retracted position. That is, if the second elongate portion 166 is disconnected from the track system 116, it would move into its retracted position and would not stop short of the retracted position, which could be the case in other embodiments.

The effective biasing factor has a value selected to suit each particular vehicle 100 and each particular embodiment of vehicle 100 and track system 116. In this embodiment, the effective biasing factor is defined by the strength of the spring 170, and is selected by selecting the spring 170 to have a particular strength.

It is contemplated that the particular characteristics and materials of the various possible components of the track systems 116 described in this document will, in most cases, have to be adapted to suit each particular vehicle with which the track systems 116 will be used. For example, in the embodiment of FIGS. 1 to 3, the dynamic traction device 160 is selected such that it has a stroke (the distance travelled by the second elongate member 166 from the retracted position to the extended position) of about 7.6 centimeters, and such that the spring 170 has a strength of about 43 Newton per millimeter.

In this embodiment, when the vehicle 100 is accelerating at a given rate of acceleration that causes a given compression of the rear shock absorber 136a, the dynamic traction device 160 applies a clockwise 176 torque (which increases with increasing acceleration) to the ground-facing frame assembly 146 and thereby transfers a given percentage (which also increases with increasing acceleration) of the vehicle weight and/or the driving forces from the engine 126 into terrain 124 via the endless track 116b passing under the trailing idler wheel assembly 150. The endless track 116b passing under the trailing idler wheel assembly 150 is shown schematically with reference numeral 172 in FIGS. 1B, 3, 7A, 7B, 9, and 10.

The counter-clockwise direction is shown with reference numeral 174 on FIG. 2. The clockwise direction is shown with reference numeral 176 on FIG. 2.

To better illustrate this functionality, reference is now made to FIGS. 2 and 3, which show the vehicle lifted off terrain. These figures show an example a movement of the rear shock absorber 136a, the swing arm 138, and the track system 116, of the present embodiment of the vehicle 100 and the track system 116.

As shown, the ground-facing frame assembly 146 has a longitudinal angular position 158 relative to the vehicle chassis 102.

FIG. 2 shows the longitudinal angular position 158 of the ground-facing frame assembly 146 having a first value (when the vehicle 100 is lifted off terrain). FIG. 3 shows the longitudinal angular position 158 of the ground-facing frame assembly 146 having a second value. The second value is two degrees larger than the first value (that is, the longitudinal angular position 158 of the ground-facing frame assembly 146 in FIG. 3 is two degrees clockwise relative to the longitudinal angular position 158 of the ground-facing frame assembly 146 in FIG. 2).

As shown, when the vehicle 100 is lifted off terrain 124, during at least a part of a movement of the swing arm 138 from the extended-suspension position (shown in FIG. 2) toward the compressed-suspension position (shown in FIG. 3), the dynamic traction device 160 applies a (clockwise 176) torque to the track system frame 140a about the rear axle 120 and thereby changes the longitudinal angular position 158 of the ground-facing frame assembly 146 clockwise 176 relative to the left side 108 of the vehicle chassis 102.

In this embodiment, when the rear shock absorber 136a moves from its neutral position (shown in FIGS. 1A and 1B) toward its compressed position (shown in FIG. 3), at least during a part of this movement, the ground-facing frame assembly 146 changes its longitudinal angular position 158 clockwise 176. This change of the longitudinal angular position 158 corresponds to a movement of the ground-facing frame assembly 146 from the extended-suspension position shown in FIG. 2 to the compressed-suspension position shown in FIG. 3. In this example, the change is positive 2 degrees (i.e. by a magnitude of 2 degrees in the clockwise 176 direction).

In other words, when the rear shock absorber 136a passes its neutral position and continues moving (compressing) toward its compressed position, at least during a part of this movement, the ground-facing frame assembly 146 changes its longitudinal angular position 158 clockwise by a given value (in degrees).

In this embodiment, the ground-facing frame assembly 146 changes its longitudinal angular position 158 clockwise by two degrees when the rear shock absorber 136a moves from its extended position to (i.e. into) its compressed position, and changes its longitudinal angular position 158 counter-clockwise by two degrees when the rear shock absorber 136a moves from its compressed position to (i.e. into) its extended position.

With respect to counter-clockwise movement, the first attachment point 164a and the second attachment point 168a are located with respect to the vehicle chassis 102 and the track system frame 140a such that when the vehicle 100 is lifted off terrain 124, during at least a part of a movement of the swing arm 138 from the compressed-suspension position toward the extended-suspension position (which movement in this case corresponds with the extension of the shock absorber 136a, which extension may occur during braking), the dynamic traction device 160 applies a (counter-clockwise 174) torque to the track system frame 140a about the rear axle 120 and thereby changes the longitudinal angular position 158 of the ground-facing frame assembly 146 counter-clockwise 174 relative to the left side 108 of the vehicle chassis 102.

In this example, this change of the longitudinal angular position 158 corresponds to the movement of the ground-facing frame assembly 146 from the position shown in FIG. 3 to the position shown in FIG. 2. In this example, the change is negative 2 degrees (i.e. by a value of 2 degrees counter-clockwise 174) from the compressed-suspension position to the extended-suspension position.

In this embodiment, when the vehicle 100 is lifted off terrain 124 (as shown with reference numeral 178 in FIG. 7A) and the rear shock absorber 136a moves from its neutral position (shown in FIGS. 1A and 1B) toward its extended position (shown in FIG. 2), at least during a part of this movement, the ground-facing frame assembly 146 changes its longitudinal angular position 158 counter-clockwise, as shown (in exaggerated magnitude, to make the figure more readable) in FIG. 8A.

It is contemplated that in other embodiments, the track system could be configured differently. For example, the locations of the first and second attachment points 164a, 168a of the dynamic traction device 160 could be located with respect to the vehicle chassis 102 and the track system frame 140a, and/or the dynamic traction device 160 could be selected, such that the dynamic traction device 160 will apply substantially no counter-clockwise torque to the ground-facing frame assembly 146 after the rear shock absorber 136a moves past its neutral position toward its extended position.

Also, it is contemplated that the track system 116 could be configured differently by, for example, selecting different locations for the first and second attachment points 164a, 168a of the dynamic traction device 160, and/or selecting a different configuration (e.g. biasing factor, lengths, geometry, etc.) of the dynamic traction device 160, and/or selecting a different suspension 136.

The different configurations of the track system 116 could be used to provide, for example, any one or both of: i) other suitable values of changes of the longitudinal angular position 158 of the ground-facing frame assembly 146, in either direction 174, 176; and ii) other suitable interrelationships between the positions of the swing arm 138, the shock absorber, and the longitudinal angular position 158 of the ground-facing frame assembly 146. For example, the different configurations could be selected to suit different vehicles while providing any one or more of the functionalities described in this document.

For example, in some embodiments, such as where the vehicle 100 is an ATV, the dynamic traction device 160 and the locations of the first and second attachment points 164a, 168a on the vehicle chassis 102 and the track system frame 140a could be selected such that when the vehicle 100 is lifted off terrain 124, during at least a part of a movement of the swing arm 138 from the extended-suspension position toward the compressed-suspension position, the dynamic traction device 160 would apply a torque to the track system frame 140a about the rear axle 120 and thereby change the longitudinal angular position 158 of the ground-facing frame assembly 146 clockwise, relative to the left side 108 of the vehicle chassis 102, by one to five degrees.

In some embodiments, the dynamic traction device 160 may contribute to changes of the longitudinal angular position 158 of the ground-facing frame assembly 146 when the vehicle 100 is driven on uneven terrain or is driven, for example, into a jump when the vehicle 100 lifts off terrain. In the embodiment of FIGS. 1 to 3, when the vehicle 100 is driven on flat horizontal terrain 124, changes of the longitudinal angular position 158 of the ground-facing frame assembly 146 do not occur, in part because the weight of the vehicle 100 acts on the track systems of the vehicle 100.

Nonetheless, the actions of the dynamic traction device 160 on the track system frame 140 that are described by the changes of the longitudinal angular position 158 of the ground-facing frame assembly 146 while the vehicle 100 is lifted off terrain 124, in some driving conditions shift the position(s) (relative to the track system frame 140a) at which one or more forces, or combinations of forces, such as driving forces from the engine 126 and vehicle weight forces, are transferred into terrain 124 via the track system 116 (further referred to as "force transfer area").

Example driving conditions during which such shifts may happen include acceleration that results in compression of the rear shock absorber 136*a* and corresponding movement of the swing arm 138.

The actions of the dynamic traction device 160 may also result in changes in magnitudes of the forces that may be transferred by the track system 116 from the vehicle 100 into the terrain 124 at various positions under the ground-facing frame assembly 146.

For example, when the vehicle 100 is driven at a constant speed over flat horizontal terrain 124, the dynamic traction device 160 (depending on the particular embodiment of the track system 116 and the vehicle 116) may apply substantially no torque to the track system frame 140*a*. In some embodiments, the dynamic traction device 160 may apply a preload torque to the track system frame 140*a* while the vehicle is driven at a constant speed over flat horizontal terrain 124.

In such embodiments, the preload torque may result from, for example, selecting a length of one or both of the first and second elongate portions 162 and 166 such that while the vehicle is driven at a constant speed over flat horizontal terrain 124, the dynamic traction device 160 is in a position between its neutral position and its extended position such that the effective biasing factor acts on the second elongate portion 166 and thereby applies a clockwise torque to the track system frame 140*a*.

When, in this example, the vehicle 100 starts accelerating sufficiently to move the swing arm 138 from its neutral position toward its compressed-suspension position, the resulting counter-clockwise 174 change of longitudinal angular position of the track system frame 140*a* would start extending the second elongate portion 166 toward its extended position.

In turn, this extension of the second elongate portion 166 would start increasing the forces (in this case, compression forces) on the spring 170. In turn, the increasing forces would start increasing the reaction forces that the spring 170 will apply to the second elongate portion 166. In turn, increasing reaction forces would start increasing the (clockwise 176) torque applied by the dynamic traction device 160 to the track system frame 140*a*.

In turn, the clockwise 176 torque may increase the forces transferred by the track system 116 into terrain 124 via the track 116*b* passing under the trailing idler wheel assembly 150. Conversely, the reverse of these effects may take place when the vehicle decelerates. The application of the various torques by the dynamic traction device 160 to the track system 166 may be said to shift the force transfer areas of one or more forces experienced by the track system 116.

The shifting of force transfer area(s) may also be described with reference to the vehicle 100 being stationary on flat horizontal terrain 124.

As described earlier, when the vehicle 100 is stationary on flat horizontal terrain 124, the swing arm 138 may be in its neutral position. In this scenario, if a downward force (shown with reference numeral 180 in FIG. 1B) is applied to the vehicle chassis 102 such that the vehicle chassis 102 moves downward (in the direction of the downward force 180) and thereby moves the swing arm 138 from the neutral position toward the toward the compressed-suspension position, during a part of this movement of the swing arm 138, the dynamic traction device would apply a clockwise 176 torque to the track system frame 140*a* about the rear axle 120 relative to the left side 108 of the vehicle 100. As a result, at least a part of the downward force 180 may be transferred into the terrain 124 via the endless track 116*b* under the trailing idler wheel assembly 150. This scenario is shown in FIG. 7B. The force transfer area of this force is shown with reference numeral 172 in FIG. 7B.

Likewise, when the vehicle 100 is stationary on flat horizontal terrain 124 and if an upward force (shown with reference numeral 182 in FIG. 1B) is applied to the vehicle chassis 102 such that the vehicle chassis 102 moves upward (in the direction of the upward force 182) and thereby moves the swing arm 138 upward from the neutral position toward the extended-suspension position, during at least a part of this movement, the dynamic traction device 160 would apply a counter-clockwise 174 torque to the track system frame 140*a* about the rear left axle 120 relative to the left side 108 of the vehicle 100. As a result, at least some of the forces experienced by the track system 116 may be transferred into the terrain 124 via the endless track 116*b* under the leading idler wheel assembly 148. This scenario is shown in FIG. 8B. The force transfer area of these forces is shown with reference numeral 184 in FIG. 8B.

In some embodiments, the locations of the first and second attachment points 164*a*, 168*a* of the dynamic traction device 160 may be selected relative to the vehicle chassis 102 and the track system frame 140*a* such that, when the vehicle 100 is on terrain 124 and the engine 126 applies a clockwise 176 torque to the rear axle 120 (to drive the vehicle 100 in reverse 130), the dynamic traction device 160 would apply a counter-clockwise 174 torque to the track system frame 140*a* about the rear axle 120 relative to the left side 108 of the vehicle 100.

Depending on the terrain 124 and on the embodiment of the vehicle 100 and track system 116, this action of the dynamic traction device 160 may transfer a part of the torque from the engine 126 into terrain via the part of the endless track 116*b* positioned proximate to or under leading idler wheel assembly 148.

Such action of the dynamic traction device 160 may provide improved vehicle performance. For example, depending on the particular embodiment of the vehicle 100 and the dynamic traction device 160, such action of the dynamic traction device 160 may improve the vehicle's ability to reverse out of snow or mud.

In some embodiments, such action of the dynamic traction device 160 may assist the vehicle 100 in climbing out of being stuck in snow or mud, by lifting the rear end of the track system 116 upward (as shown by reference arrow 186 on FIG. 8B) when the engine 126 applies a clockwise 176 torque to the rear axle 120 to drive the vehicle 100 in reverse 130.

Additional aspects of the present technology are described next.

It is contemplated that, for example, the effective biasing factor of the dynamic traction device 160 of a particular track system may be selected to achieve particular desired locations of the force transfer areas, and particular degrees of force transfer, of the various forces that may be transferred by the particular track system into terrain 124 when the particular track system is in use. The effective biasing factor may also be selected to suit particular vehicles and particular applications of vehicles.

For example, when the vehicle 100 is in use, movements of the swing arm 138 may result, among other causes, from acceleration of the vehicle 100, or driving the vehicle 100 upward on inclined terrain. For example, when the vehicle 100 drives up on inclined terrain, the rear shock absorber 136*a* may be compressed to a position below its neutral position and the swing arm 138 may be in a position between its neutral position and its compressed-suspension position.

Accordingly, the dynamic traction device 160 may apply a clockwise 176 torque, relative to the left side of the vehicle 100, to the track system frame 140*a*. The torque, and a particular value of the torque, may result from a particular selection of the effective biasing factor. For example, a relatively larger biasing factor may be selected to result in relatively larger values of the torque. In some cases and driving conditions, application of such torque may improve the vehicle's performance in climbing inclined terrain.

To this end, the length and other characteristics of the dynamic traction device 160 may be selected to suit particular vehicles 100 and track systems 116 with which the dynamic traction device 160 may be used. For example, a particular variable dynamic transfer of forces, as described in this document, may be desired for a particular vehicle 100 for a particular application. A particular embodiment and placement of the dynamic traction device 160, as described in this document, may then be selected to provide the vehicle's 100 track systems 116, 118 with the desired dynamic traction of forces. Two example applications of the vehicle 100 may be, for example, climbing inclined terrain and acceleration.

In one example, the locations of the first and second attachment points 164*a*, 168*a* for the dynamic traction device 160 could be selected with respect to the vehicle chassis 102 and the track system frame 140*a*, and/or the dynamic traction device 160 (e.g. dimensions, and effective biasing factor) may be selected, such that during at least a part of a movement of the swing arm 138 from the extended-suspension position toward the compressed-suspension position, the dynamic traction device 160 would apply a torque to the track system frame 140*a* to provide a movement profile shown (in exaggerated form, for easier readability of the figures) in FIG. 9 or FIG. 10.

A particular movement profile of the ground-facing frame assembly 146 may be obtained by using known computer motion simulation software suites (for example, Solid-Works™ or AutoCad™) and known engineering methods.

For example, the vehicle 100, and the dynamic traction device 160, may be modeled on a suitable motion and/or force simulation software suite, using all of the necessary dimensions and characteristics of the vehicle's components. Then trajectories of motion of at least the swing arm 138, the track system 116, and the rear suspension 136 may be simulated in the software.

Then, in the software, a preliminary location for the first attachment point 164*a* of the dynamic traction device 160 of the track system 116 may be selected on the vehicle chassis 102. Then, in the software, a preliminary location for the second attachment point 168*a* of the dynamic traction device 160 may be selected on the track system frame 140*a*, based on the trajectories of at least the swing arm 138, the track system 116, and the rear suspension 136.

Then, the resulting movement profile of the ground-facing frame assembly 146 may be modeled using the software. Then, deviations from the desired movement profile may be noted. Then, the deviations may be reduced or eliminated by using a suitable known iterative process.

That is, the preliminary location(s) of one or both of the first and second attachment points 164*a*, 168*a* may be modified in iterations while monitoring the resulting changes to the movement profile of the ground-facing frame assembly 146. The iterations may be repeated until the desired movement profile (for example such as the movement profiles shown in FIGS. 7A, 7B, 9 and 10) is obtained. The dimensions, the effective biasing factor, or other characteristics of the dynamic traction device 160 may also be modified to adjust the resulting movement profile.

Yet another aspect of the present technology is described next.

In the embodiment of FIGS. 1 to 3, the portion of the vehicle chassis 102 labeled with reference numeral 102*a* extends into a width dimension defined by outer lateral edges 200 of the track, such that the dynamic traction device 160 is disposed within said width dimension. In the present embodiment, said portion 102*a* of the vehicle chassis 102 is positioned inward of the track system 116, on the side of the track 116 that faces the rear shock absorber 136*a*.

In some applications, for example where the vehicle 100 is driven through snow, placement of the dynamic traction device 160 within said width dimension may reduce the drag of the vehicle 100, by, for example, reducing the drag of the dynamic traction device 160 on the snow.

Yet an additional aspect of the present technology is described next.

For example, in some embodiments, the dynamic traction device 160 may be selected such that when the ground-facing frame assembly 146 is in a range of three to ten degrees below the horizontal plane 188, second elongate portion 166 is in the retracted position. In some embodiments, the dynamic traction device 160 may be selected such that when the ground-facing frame assembly 146 is in a range of fifteen to thirty degrees above the horizontal plane 188, the second elongate portion 166 is in the extended position.

In some embodiments, for example when the track system is to be used with a Side-by-Side Vehicle, the dynamic traction device 160 may be selected such that when the ground-facing frame assembly 146 is in a range of fifteen to thirty degrees below a horizontal plane, the second elongate portion 166 is in the retracted position. In some embodiments in such applications, the dynamic traction device 160 may be selected such that when the ground-facing frame assembly 146 is in a range of fifteen to forty degrees above the horizontal plane, the second elongate portion 166 is in the extended position.

In a further aspect, it is contemplated that the dynamic traction device 160 could have any other construction adapted to provide the functionality of the present technology to a particular vehicle. For example, the first and second elongate portions 166, 168 of the dynamic traction device 160 may be referred to as links.

Accordingly, in the embodiment of FIGS. 1A to 4B, the dynamic traction device 160 has two links 166, 168. In other embodiments, the dynamic traction device 160 may have more than two links, so long as the links are interconnected so as to provide for at least one of the various possible combinations of functions of the dynamic traction device 160 that are described in this document. For example, the dynamic traction device 160 may have three or more interconnected links.

Yet another aspect of the present technology is described next.

In one embodiment of the vehicle 100 of FIGS. 1A to 3, the trailing idler wheel assembly 150 extends about 102 centimeters rearward 130 of the rear axle 120, as shown with reference dimension line 202. In some applications of the vehicle, dimensioning the track system frame 140*a* to provide this dimension 202, in combination with the dynamic traction device 160 provides performance advantages. In some cases, performance advantages include improved acceleration and incline terrain climbing ability.

It is contemplated that, in some cases, the track system frame 140a may be dimensioned to provide the dimension 202 in a range of 45 to 155 centimeters inclusive. In such embodiments, the combination of the dimension 202 and the action of the dynamic traction device 160 may provide performance advantages to the vehicle 100 in some terrain and driving conditions.

It is contemplated that the track systems 116 described in this document could be used on vehicles having one or more suspensions with one or more swing arms 138. It is contemplated that the swing arms 138 need not be positioned in the rear of the vehicles. Accordingly, it is contemplated that the track systems 116 are not limited to use in the rear of a vehicle.

The track systems 116 and the dynamic traction devices 160 described in this document, as well as the other components of the example vehicles, could be implemented using any suitable known materials, engineering, and manufacturing methods.

The position of the ground-facing frame assembly 146 when the vehicle 100 is lifted off terrain 124 is not necessarily horizontal (that is, in some embodiments it could be horizontal, in other embodiments it could be non-horizontal). It will be understood that since the movement profiles of the ground-facing frame assembly 146 have been defined in terms of changes of the longitudinal angular position of the ground-facing frame assembly 146, the fact of whether or not the position of the ground-facing frame assembly 146 when the vehicle 100 is lifted off terrain 124 is horizontal does not affect the movement profiles.

Modifications and improvements to the above-described implementations of the present technology may become apparent to those skilled in the art. The foregoing description is intended to be exemplary rather than limiting.

The invention claimed is:

1. A track system for attachment to a vehicle including:
   I) a vehicle chassis having a front portion, a rear portion, a left side, and a right side;
   II) a rear suspension having a swing arm attached to the rear portion of the vehicle chassis, the swing arm being moveable between a compressed-suspension position and an extended-suspension position;
   III) an engine supported by the vehicle chassis for providing motive power to propel the vehicle;
   IV) a rear axle being in driven connection with the engine; the track system comprising:
   a) a track system frame being pivotably attachable to the swing arm about the rear axle, the track system frame having an upper frame portion and a ground-facing frame assembly, the ground-facing frame assembly having a leading idler wheel assembly and a trailing idler wheel assembly attached thereto, the ground-facing frame assembly having a longitudinal angular position relative to the vehicle chassis when the track system frame is pivotably attached to the swing arm;
   b) a drive sprocket being in driven connection with the rear axle when the track system frame is pivotably attached to the swing arm;
   c) an endless track mounted around the drive sprocket, the leading idler wheel assembly, and the trailing idler wheel assembly, the endless track being in driven connection with the drive sprocket; and
   d) a dynamic traction device having:
      i) a first elongate portion having a first distal end, and
      ii) a second elongate portion having a second distal end opposed to the first distal end, the second elongate portion being movable relative to the first elongate portion between a retracted position and an extended position, the second elongate portion being biased toward the retracted position,
      iii) the first and second distal ends being closer together in the retracted position than in the extended position, and
      iv) when
         A) the track system frame is pivotably attached to the swing arm,
         B) the drive sprocket is in driven connection with the rear axle,
         C) the first distal end is pivotably attached to the vehicle chassis at a first attachment point, and
         D) the second distal end is pivotably attached to the track system frame at a second attachment point, the first attachment point and the second attachment point are located with respect to the vehicle chassis and the track system frame such that when the vehicle is lifted off terrain, during at least a part of a movement of the swing arm from the compressed-suspension position toward the extended-suspension position, the dynamic traction device applies a torque to the track system frame about the rear axle and thereby changes the longitudinal angular position of the ground-facing frame assembly counterclockwise relative to the left side of the vehicle chassis.

2. The track system of claim 1, wherein when the vehicle is lifted off terrain, during at least a part of a movement of the swing arm from the extended-suspension position toward the compressed-suspension position, the dynamic traction device applies a torque to the track system frame about the rear axle and thereby changes the longitudinal angular position of the ground-facing frame assembly clockwise relative to the left side of the vehicle chassis.

3. The track system of claim 2, wherein when the vehicle is lifted off terrain, during at least a part of a movement of the swing arm from the extended-suspension position toward the compressed-suspension position, the dynamic traction device applies a torque to the track system frame about the rear axle and thereby changes the longitudinal angular position of the ground-facing frame assembly clockwise, relative to the left side of the vehicle chassis, by one to five degrees.

4. The track system of claim 1, wherein
   i) when the vehicle is stationary on flat horizontal terrain, the swing arm is in a neutral position that is between the compressed-suspension position and an extended-suspension position; and
   ii) when a downward force is applied to the vehicle chassis such that the vehicle chassis moves downward and thereby moves the swing arm from the neutral position toward the toward the compressed-suspension position, during at least a part of this movement of the swing arm, the dynamic traction device applies a clockwise torque to the track system frame about the rear axle relative to the left side of the vehicle.

5. The track system of claim 1, wherein when
   i) the vehicle is stationary on flat horizontal terrain,
   ii) the swing arm is a neutral position that is between the compressed-suspension position and an extended-suspension position; and
   iii) an upward force is applied to the vehicle chassis such that the vehicle chassis moves upward and thereby moves the swing arm from the neutral position toward the extended-suspension position, during at least a part of this movement of the swing arm, the dynamic traction device applies a counter-clockwise torque to the track system frame about the rear axle relative to the left side of the vehicle.

6. The track system of claim 1, wherein while the vehicle is accelerating in a forward direction over uneven terrain, the dynamic traction device applies substantially a clockwise-only torque to the track system frame about the rear axle relative to the left side of the vehicle chassis.

7. The track system of claim 1, wherein the trailing idler wheel assembly extends rearward of the rear axle by a distance of between 45 centimeters to 155 centimeters inclusive.

8. The track system of claim 1, wherein:
   i) when the vehicle is on flat horizontal terrain, the second elongate portion is in a neutral position; and
   ii) the second elongate portion is biased from the neutral position to the retracted position.

9. The track system of claim 1, wherein:
   i) when the ground-facing frame assembly is in a range of three to ten degrees below a horizontal plane, the second elongate portion is in the retracted position; and
   ii) when the ground-facing frame assembly is in a range of fifteen to thirty degrees above the horizontal plane, the dynamic traction device is in the extended position.

10. The track system of claim 1, wherein:
    i) when the ground-facing frame assembly is in a range of fifteen to thirty degrees below a horizontal plane, the second elongate portion is in the retracted position; and
    ii) when the ground-facing frame assembly is in a range of fifteen to forty degrees above the horizontal plane, the dynamic traction device is in the extended position.

11. The track system of claim 1, wherein:
    i) the dynamic traction device includes a cylinder, the cylinder having a first end and a second end opposite the first end;
    ii) the first elongate portion extends from the first end of the cylinder away from the second end of the cylinder;
    iii) the second elongate portion is slidable into the cylinder; and
    iv) the second elongate portion extends from the second end of the cylinder away from the first end of the cylinder.

12. The track system of claim 11, wherein:
    i) the dynamic traction device includes:
       A) a resilient stopper disposed inside the cylinder proximate the first end of the cylinder, and
       B) a spring disposed inside the cylinder proximate the second end of the cylinder;
    ii) the second elongate portion includes a head portion sized to engage the spring in compression;
    iii) the head portion is opposite the second distal end of the second elongate portion; and
    iii) the head portion is disposed between the resilient stopper and the spring.

13. The track system of claim 12, wherein:
    i) the resilient stopper is a rubber stopper;
    ii) the spring is a helical spring defining an aperture; and
    iii) a part of the second elongate portion is disposed inside the aperture of the spring.

14. The track system of claim 1, wherein the first elongate portion is substantially collinear with the second elongate portion at all times while the second elongate portion moves between its retracted position and its extended position.

15. The track system of claim 1, wherein the dynamic traction device is disposed within a width dimension defined by outer lateral edges of the track.

16. The track system of claim 3, wherein when
    i) the vehicle is stationary on flat horizontal terrain,
    ii) the swing arm is a neutral position that is between the compressed-suspension position and an extended-suspension position; and
    iii) an upward force is applied to the vehicle chassis such that the vehicle chassis moves upward and thereby moves the swing arm from the neutral position toward the extended-suspension position,
    during at least a part of this movement of the swing arm, the dynamic traction device applies a counter-clockwise torque to the track system frame about the rear axle relative to the left side of the vehicle.

17. The track system of claim 16, wherein while the vehicle is accelerating in a forward direction over uneven terrain, the dynamic traction device applies substantially a clockwise-only torque to the track system frame about the rear axle relative to the left side of the vehicle chassis.

18. The track system of claim 16, wherein:
    i) the dynamic traction device includes a cylinder, the cylinder having a first end and a second end opposite the first end;
    ii) the first elongate portion extends from the first end of the cylinder away from the second end of the cylinder;
    iii) the second elongate portion is slidable into the cylinder; and
    iv) the second elongate portion extends from the second end of the cylinder away from the first end of the cylinder.

19. The track system of claim 4, wherein when
    i) the vehicle is stationary on flat horizontal terrain,
    ii) the swing arm is a neutral position that is between the compressed-suspension position and an extended-suspension position; and
    iii) an upward force is applied to the vehicle chassis such that the vehicle chassis moves upward and thereby moves the swing arm from the neutral position toward the extended-suspension position,
    during at least a part of this movement of the swing arm, the dynamic traction device applies a counter-clockwise torque to the track system frame about the rear axle relative to the left side of the vehicle.

20. The track system of claim 18, wherein while the vehicle is accelerating in a forward direction over uneven terrain, the dynamic traction device applies substantially a clockwise-only torque to the track system frame about the rear axle relative to the left side of the vehicle chassis.

* * * * *